(12) United States Patent
Harrison

(10) Patent No.: US 12,083,058 B2
(45) Date of Patent: Sep. 10, 2024

(54) BRAKE SYSTEM

(71) Applicant: BRINTAL LIMITED, St. Sampsons (GG)

(72) Inventor: Brian Harrison, St. Andrews (GG)

(73) Assignee: BRINTAL LIMITED, Guernsey (GB)

( * ) Notice: Subject to any disclaimer, the term of this patent is extended or adjusted under 35 U.S.C. 154(b) by 1274 days.

(21) Appl. No.: 16/632,035

(22) PCT Filed: Jul. 16, 2018

(86) PCT No.: PCT/EP2018/069280
§ 371 (c)(1),
(2) Date: Jan. 17, 2020

(87) PCT Pub. No.: WO2019/016144
PCT Pub. Date: Jan. 24, 2019

(65) Prior Publication Data
US 2020/0146908 A1     May 14, 2020

(30) Foreign Application Priority Data
Jul. 17, 2017 (GB) .................................... 1711438

(51) Int. Cl.
*A61G 5/10*       (2006.01)
*B60T 7/08*       (2006.01)
(Continued)

(52) U.S. Cl.
CPC ......... *A61G 5/1013* (2013.01); *A61G 5/1037* (2013.01); *B60T 7/08* (2013.01);
(Continued)

(58) Field of Classification Search
CPC .............................. B60T 7/08; F16D 2125/60
See application file for complete search history.

(56) References Cited

U.S. PATENT DOCUMENTS 3,845,847 A    11/1974   Camp
4,116,464 A     9/1978   Haley
(Continued)

FOREIGN PATENT DOCUMENTS

CA    2260585 A1    8/2000
FR    2683503 A1 * 5/1993 ............ B60T 13/141
(Continued)

OTHER PUBLICATIONS

British Standards Institution, "Electrically powered wheelchairs, scooters and their chargers. Requirements and test methods", Section 8.4 Braking system; Standard No. BS EN 12184:2009; ISBN: 978 0 580 65400 8, London, United Kingdom, Mar. 31, 2010, 62 pages.
(Continued)

*Primary Examiner* — Melody M Burch
(74) *Attorney, Agent, or Firm* — Dorsey & Whitney LLP

(57) ABSTRACT

A brake system for use with a wheeled device, such as a wheeled person transportation device, such as a wheelchair. The brake system comprises a handle comprising a first portion and a second portion, wherein the first portion is moveably coupled to the second portion; a carrier comprising an internal cavity; a brake actuator for actuating a brake, the brake actuator being arranged within the internal cavity; brake actuator biasing means for applying a biasing force to the brake actuator for biasing the brake actuator to a brake-engaged position; and force-transfer means coupled to the first portion and to the brake actuator such that movement of the first portion towards the second portion causes the brake actuator to move along the internal cavity of the carrier against the biasing force to a brake-disengaged position.

22 Claims, 6 Drawing Sheets

(51) Int. Cl.
*B62B 9/08* (2006.01)
*F16D 65/14* (2006.01)
*F16D 121/14* (2012.01)
*F16D 125/60* (2012.01)

(52) U.S. Cl.
CPC .............. *B62B 9/085* (2013.01); *F16D 65/14* (2013.01); *F16D 2121/14* (2013.01); *F16D 2125/60* (2013.01)

(56) References Cited

U.S. PATENT DOCUMENTS

| | | | |
|---|---|---|---|
| 4,271,933 A | 6/1981 | Pearce et al. | |
| 4,852,697 A | 8/1989 | Kulik | |
| 4,977,792 A * | 12/1990 | Nagano | B62L 3/02 |
| | | | 74/489 |
| 4,987,978 A | 1/1991 | Jungersen | |
| 5,263,729 A | 11/1993 | Watwood et al. | |
| 5,280,938 A | 1/1994 | Berry | |
| 5,325,938 A * | 7/1994 | King | B62B 5/0419 |
| | | | 188/29 |
| 5,667,236 A | 9/1997 | Murphy | |
| 5,713,585 A | 2/1998 | Curtis et al. | |
| 5,865,065 A * | 2/1999 | Chiu | A61G 5/101 |
| | | | 74/489 |
| 5,894,912 A | 4/1999 | Dobben | |
| 6,371,503 B2 | 4/2002 | Ritchie et al. | |
| 7,066,482 B2 | 6/2006 | Ford | |

FOREIGN PATENT DOCUMENTS

| | | | | |
|---|---|---|---|---|
| FR | 2919173 A1 | 1/2009 | | |
| GB | 2344626 A | 6/2000 | | |
| WO | WO-9851557 A1 * | 11/1998 | ........... | A61G 5/1008 |
| WO | WO-2004074069 A1 * | 9/2004 | ................ | B62B 5/04 |

OTHER PUBLICATIONS

PCT International Search Report and Written Opinion mailed Feb. 28, 2019, for PCT Application PCT/EP2018/069280, 14 pages.

* cited by examiner

BRAKE SYSTEM

CROSS REFERENCE TO RELATED APPLICATIONS

This application is a national stage application under 35 U.S.C. § 371 of International Application No. PCT/EP2018/069280, filed Jul. 16, 2018, entitled "A BRAKE SYSTEM," which claims priority to United Kingdom Patent Application No. 1711438.0, filed Jul. 17, 2017, each of which is incorporated by reference herein, in the entirety and for all purposes.

BACKGROUND

The present disclosure relates to a brake system for use with a wheeled device and may be embodied as a brake system for use with a wheelchair, a wheeled device comprising the brake system, a personal transport device comprising the brake system or a wheelchair comprising a brake system.

SUMMARY

Manual wheelchair braking solutions are well known in prior art, and generally fall into two separate categories, requiring two separate and individual actions to operate. These categories are dynamic braking and static braking.

Dynamic braking is the controlled slowing of a vehicle from moving to a standstill, and, as those skilled in the art will know, generally consists of a pair of bicycle type brake levers mounted on each of the push handles, controlled and operated by each hand of the attendant or carer. When squeezed hard by the fingers of the carer, the brake levers tension a brake cable, which in turn pulls a lever mechanism at the other end of the cable, which operates either a brake drum, a disc calliper, or in some cases merely causes a lever to rub against the outer section of a rotating tyre, with the aim of slowing the vehicle. It is accepted that when the levers are released, the vehicle is able to freewheel once more.

Static, or parking braking, is generally achieved by either manually swivelling a lever connected to the chassis, which pushes up against the outer section of each of the tyres, or in some cases is a separate function of the bicycle type brake levers mounted on the push handles, whereby the brake levers are released, allowing the wheelchair to roll, and then which are pushed down in the opposite direction by the carer into a 'lock' position. Those skilled in the art will recognise the simplicity, and the short comings, of these well-known devices.

It is common teaching that dynamic, progressive and static braking are to be performed by separate mechanisms or levers. The use of separate actuators in this way relies upon transferring the varying input of effort applied by the operator, generally from a lever and via a brake cable, to a suitable drum, disc, or another type of known brake. It is important to note that, in such devices, the strength of the carer is vital in performing braking correctly, and is therefore the limiting factor, with the maximum braking force that can be transferred to the brakes being directly and proportionately limited by the strength of the user. The type and shape of the brake levers, and the size and type of brakes fitted are all contributing factors which also limit overall brake performance, making the maximum available braking force an unknown quantity. Trying to stop a wheelchair, particularly when in the not unusual scenario of being on a gradient with a heavy occupant of at least 100 kg, requires a very strong force input from the carer, and relies entirely upon the strength of the carer's hands. In many cases the carer is simply not comfortable, or physically capable of taking the responsibility of negotiating certain terrain or gradients for fear of the wheelchair running away from them in case the required braking force, an unknown quantity, is greater than the maximum braking force the carer is able to provide. Furthermore, if the wheelchair slips out of their hands there is nothing they can do.

The actual braking mechanisms offered in prior art are in many cases under-engineered, relying solely on the friction of a lever rubbing against the outside of the tyre. Such mechanisms are simplistic, prone to failure and have no set standard of operation.

It is well known that there are particular risks and dangers associated with caring for a wheelchair occupant, many of whom are vulnerable people, and ensuring they are safe at all times. During normal everyday use, and while engaging in regular activities, the necessity to ensure that the static brakes are manually engaged every single time the carer stops pushing or removes their hands from the push handles even for a few seconds is a constant worry and yet another responsibility for the carer. On a slight gradient, or on uneven ground, when distracted or just in a hurry, it is all too easy to forget to put the parking brake on, and in such scenarios, unless the parking brakes are immediately engaged, a heavy wheel chair will easily swing around, or roll off, potentially causing injury to the carer or the occupant. Moreover, with an occupant on board, on any slope or ramp, the amount of pressure required on the brake levers, in addition to trying to also apply the parking brake, can make the wheelchair difficult to control and manage.

Once at a standstill, the transition from dynamic to static/parking braking often requires that the user takes their hands off the push handle, allowing the wheels to potentially rotate again and for the wheelchair to roll off, before the user is able to reach down and enable the parking brakes. This is another problem and concern.

It is also well known that it is vital to have brakes engaged prior to allowing a potential user to enter or exit the seat, to prevent accidents due to the chair rolling backwards. There have been various attempts to devise braking mechanisms which focus specifically on this problem, including installing pressure pads under the seat, whereby a brake is constantly engaged until the weight of the user on the base of the seat releases the mechanism. Some of these ideas are rather complicated, and also forget that the wheelchair may be parked on a gradient, so once they get in, it could roll off anyway. These ideas also ignore dynamic, parking and failsafe requirements.

Regarding powered wheelchairs and all other powered medical products, regulations and standards are set out in BS EN 12184:2009 (8.4 Braking system). They require fitment of an automatic 'hands off' type of braking system that operates when the person controlling the vehicle lets go of the controls, or in the event that battery power is lost. Prior art suggests that the only failsafe braking system used on all types of powered mobility vehicles is a magnetic spring loaded brake which requires current from a battery to magnetically hold a brake/friction disc "off" so that, if there is a power failure, the brake comes "on" and the vehicle comes to a safe standstill. Those skilled in the art will recognise these systems that are commonly used.

Unfortunately, the downside is that there is no option for progressive dynamic braking with a magnetic spring assisted brake, as it just snaps on, or off, so the carer is totally reliant on engine braking, with no option for carer input or freewheeling. Such systems also constantly use battery power. Magnetic spring assisted brakes are also generally only used on geared motors, and attach to the motors gearbox to benefit from the increased gearing ratio, as, if they were a 1:1 ratio, the size would be so large as to be prohibitive. Also, it is not possible to freewheel a product with a geared motor because of the gearbox drag, and this reduces options and makes a transition from powered to pushing complicated.

Because spring assisted brakes are not easily compatible with direct drive hub motors, and do not conform to regulations, these motors, although they would be an excellent option, are not currently used on mobility products due to the regulations. Furthermore, there are also many ultra-lightweight scooters currently on the market which use bicycle type brake levers and cables that are widely used by the disabled community, but do not qualify as an official mobility product as they do not have mechanical failsafe braking. Subsequently, a potential purchaser of such devices does not receive government funding, or VAT tax relief, which limits their affordability and therefore accessibility to the end user. In Europe, as much as 95% of mobility products sold are government funded, so the ability to be classified within the regulations makes all the difference to a product's commercial success.

U.S. Pat. No. 5,280,938 discloses a wheelchair brake.

U.S. Pat. No. 4,271,933 discloses a wheelchair brake attachment.

U.S. Pat. No. 4,987,978 discloses a wheelchair safety brakes.

U.S. Pat. No. 4,852,697 discloses wheelchair handbrakes with actuator tube and replaceable brake stopper.

U.S. Pat. No. 5,263,729 discloses a wheelchair driver and braking system.

U.S. Pat. No. 6,371,503 discloses a wheelchair automatic anti-rollback assembly.

U.S. Pat. No. 5,894,912 discloses a wheelchair braking device.

U.S. Pat. No. 7,066,482 discloses a handle assembly for wheel chair brake mechanism.

U.S. Pat. No. 5,667,236 discloses a control grip brake for wheelchairs.

While the above devices may fulfil their respective particular objectives and requirements, the aforementioned prior art do not describe an integrated, easy to use, powerful, dynamic, static and hands free brake control device using an adequate and quantifiable braking force for a wheelchair, with the combination of mechanically inventive and practical benefits as described herein. In this respect, it can be appreciated that the present disclosure substantially departs from conventional concepts and designs of the prior art.

Consequently, there remains a need in the mobility industry to provide an inexpensive and user friendly, non-electrical, seamless dynamic and static braking system for manually assisted wheelchairs, and other associated products both manual and powered, that prevents injury during user entry and exit from wheelchairs, removes the worry and responsibility of manually locking the static brakes every time the carer takes their hands off the push handles, and offers an effective and known powerful braking force, irrespective of the brakes fitted, the size and weight of the occupant, or the size and strength of the carer. Furthermore, offering a solution to lightweight scooters to offer failsafe braking and thereby be classed within the regulations to receive government funding and VAT relief.

The present disclosure requires uniquely low user input, to vary a high spring pressure which provides a combination of progressive, dynamic, static, and automatic mechanical failsafe braking. It is primarily designed for, but not limited to, manually pushed wheelchairs, attendant controlled power assisted wheelchairs, mobility scooters and other carer, user, or combination operated wheeled devices, not excluding other products such as wheelbarrows, children's pushchairs, prams and trolleys.

The brake system of the present disclosure is able to be retro-fitted to existing manual and powered attendant wheelchairs, seamlessly replacing the original hand grips, brake levers and fittings, by simply sliding onto the standard handlebar tubing, and connecting to existing brake cables.

One of the many important safety features of the present disclosure, is removing the worry and concern from the carer as to whether the brakes are left on or off, and therefore if the occupant is safe from rolling away, whilst offering total confidence of brake control and standardized performance in all situations, irrespective of their strength or the occupants weight, all in a familiar, simple, and neat multifunctional package. Another objective is to offer a stated Nm force of cable tension, suitable to operate a wide range of brake products and applications, whilst not relying on the carer's strength, and furthermore operating effectively and safely across a full range of practical, static and dynamic requirements.

A further benefit of the present disclosure is that when the carer is not present and a wheelchair is unattended, both of the brakes are automatically locked to a given force. Unless a carer or attendant is holding the handgrips, the brakes cannot be partially on, only fully and safely on. The compression springs are fitted to suit the particular wheel chair specification, matching the load, the type of brakes, and the wheels and tyres fitted, ensuring that when the carer is not holding the push handles, the wheels are automatically locked correctly to hold a stated given load on a stated gradient. This also enables a person to safely enter or exit the seat independently, without the vehicle rolling, and if medically possible, without any help from the carer. It is incredibly important to someone with a disability to be able to lean on the chair, and use it to help lower themselves into the seated position safely, without fear of the wheelchair moving around at all.

When the attendant or carer is ready to go, as they hold both the handgrips to start pushing the occupant along, the upper portion of the handle naturally rotates down onto the lower hand grip, whereby the brakes automatically disengage and the wheels are free to rotate, enabling the wheel chair to roll along. The disclosure is configured such that the act of squeezing the first portion of the handle gently downwards feels totally natural, and takes no real noticeable effort, as to start moving forward they are naturally moving their hands in a forward direction anyway Once underway, progressive dynamic braking on the move is achieved easily, by the carer opening their hands slightly and releasing a little pressure on the first portion of the handles, so the brakes are gradually applied. As it is the power of compression springs, not their physical pressure on the handle that supplies the force through the cables to the wheels, the carer only has to use a very small amount of effort to operate and adjust the braking.

In prior art, using traditional bicycle type of levers, maximum braking effort is achieved by squeezing the lever as hard as possible to apply as much pressure on the brakes as possible, with the input force of the user directly proportionate to the output force. However, with the current disclosure, the more the carer relaxes their hands and allows the upper handle to open, and therefore the less effort they use, the more the brakes are gradually applied, until the maximum rated spring force is applied which brings the vehicle to a complete standstill. As they remove their hands from the handles, the brakes remain fully locked—safe again.

This 'hands off' failsafe mechanism is invaluable when considering safety during everyday wheel chair use, where the chair is pushed and stopped on numerous occasions time and time again. Every single time the chair stops, and the carer takes their hands away, the brakes are automatically engaged to a known safe degree, and the occupant feels safe. This can literally be hundreds of times a day. Safe, with the brakes on, and out of danger is always the default setting when the occupant of the wheelchair is left unattended. This gives complete peace of mind to all parties, and totally alters the status from a health and safety or risk assessment perspective, with the responsibility no longer on the carer, or the occupant, to ensure the brakes are correctly deployed, removing any previous worry and stress.

Furthermore, in an emergency, should the carer slip, trip, or even throw both their hands in the air, as soon as they let go of the handles for any reason at all, the upper handles (which may be referred to as a first portion of the handle) rotate back up and the brakes are fully applied, ensuring that the wheelchair comes to a standstill and the occupant is safe. This is a huge step forward from using a traditional wheelchair, where if the carer trips or slips over, the wheelchair is free to career off out of control and into danger.

The current disclosure also incorporates a 'brake override' lever (or rotation limiter), which is an integral part of the upper handle. This is for use only in circumstances when there is no occupant in the chair, and for ease of manoeuvrability, pushing, packing or stacking the vehicle. This override lever locks the upper pivoting brake handle down, preventing it from springing back up as it would in normal use, so that the wheelchair can freewheel without any pressure on the handles. This is again designed with absolute safety in mind, and because the brake override lever is integrated into the top rear section of the upper lever, any pressure to start moving off again, and the override is disabled, the wheels lock, and the wheelchair is back to safety brake mode. This is mainly intended for use when the wheelchair is folded narrow and being packed or transported, and the positioning of this lever intuitively prevents it from being pushed in 'free wheel' mode with an occupant.

The present disclosure delivers a suitable, and specified, given braking force to correctly operate the brakes, with only the lightest of touches from the operator. Because a known Nm force is transferred to the brake cable via a specifically rated compression spring, there is no question over braking performance available.

Starting with the lever held down, and the brakes off, as the upper handle lever is allowed to start pivoting back, the lower profile face of the cam is gradually engaged with the piston allowing spring extension to take place, which in turn pulls the inner attached cable whose distal end is attached to the wheel brake lever. The brake is gradually applied through a range of dynamic braking options, chosen by the carers input, and when allowed to do so, the upper handle eventually reaches an 'up' position where the wheels are fully locked.

When the upper handle is gently pushed back down into place onto the lower grip to release the brake, during this rotation, the cam revolves around gradually until it is engaging the highest profile section of the cam with the piston, and thus exerting gradually more and more pressure on the piston, which in turn slides the piston further within the cylinder, thus compressing the spring and relieving the tension on the attached cable, thereby releasing the wheel and the brake is now off. When the upper handle is fully seated down onto the lower grip, the small pressure of holding it in place becomes practically non-existent due to the engagement angle of the cam in relation to the piston, the pivot point, and the hinge. The effort it takes is practically unnoticeable to the user.

Additionally, the present disclosure comprising multi-functional dynamic, static, failsafe, and override modes, is an option for all current powered mobility products such as scooters and power chairs, as it conforms within the regulations and complies with standards set out for all powered medical mobility products in BS EN 12184:2009 Para: 8.4 Braking system. Regulations currently require "an automatic brake, which operates independent of tyre wear and tyre inflation pressure and is operated by releasing the control device to achieve a zero speed command (e.g. spring loaded disc brake)" This disclosure could easily be fitted to the handlebars of products such as mobility scooters, and replace the need for electromagnetic safety brake systems, allowing the use of a direct drive hub motor on mobility products, and all the benefits they bring, such as spinning freely and seamlessly providing power assistance for manually pushed products such as attendant controlled power wheelchairs. It offers light weight mobility scooters a mechanical solution to add failsafe braking to them without the need to use a magnetic spring assisted brake, or needing the electric power, thereby officially classifying them as mobility products, enabling government funding and VAT exemption.

Furthermore, the current disclosure offers a neat, clean looking practical solution, without the need for multiple mechanisms or traditional brake levers, with the single brake cable all neatly hidden inside the chassis of the wheelchair for a good proportion of its routing from the handles to the wheels. This is a vast improvement on current outboard brake cables which get in the way and can get easily caught on other objects. It also has the advantage of using no battery power to operate.

From a commercial and cost perspective, the present disclosure is a simple and easy device to manufacture, and will not add any significant cost to the price of product manufacture, thereby enabling it to be affordable for many people who currently use wheelchairs.

The present disclosure aims to alleviate, at least to a certain extent, the problems and/or address at least to a certain extent the difficulties with the prior art.

According to a first aspect of the present disclosure there is provided a brake system for use with a wheeled transportation device, the brake system comprising:
- a handle comprising a first portion and a second portion, wherein the first portion is moveably coupled to the second portion;
- a carrier comprising an internal cavity;
- a brake actuator for actuating a brake, the brake actuator being arranged within the internal cavity;
- brake actuator biasing means for applying a biasing force to the brake actuator for biasing the brake actuator to a brake-engaged position; and
- force-transfer means coupled to the first portion and to the brake actuator such that movement of the first portion towards the second portion causes the brake actuator to move along the internal cavity of the carrier against the biasing force to a brake-disengaged position.

The movement of the first portion of the handle (which may be in some embodiments a brake lever) is thereby converted into linear motion of the brake actuator. The biasing means therefore may pre-tension a brake cable which may, in use, be attached or coupled to or received by the brake actuator. As such, the biasing means causes the break system to engage a brake when a user does not apply a force to the first portion of the handle. Optionally, the brake actuator biasing means may be configured to apply a biasing force to the brake actuator for biasing the brake actuator to a brake-engaged position. When the first portion is moved by a user towards the second portion, the brake actuator is caused to be moved against the biasing force, thereby releasing the tension in a brake cable which may, in use, be attached or coupled to the brake actuator, and thereby enabling the brake to be progressively disengaged by progressive movement of the first portion towards the second portion. Thus, an automatic "hands-off" emergency brake is provided which causes the brakes to be engaged whenever a user releases their hands from the handle, thus providing for a safer brake system which is more compact, requires fewer components and can be easily retro-fitted to an existing wheeled device (such as a wheelchair). The present disclosure therefore does away with the need for separate static and dynamic braking systems and the braking force is sufficient for a static brake and can be progressively and precisely reduced, thereby functioning as a dynamic brake. As the brake system is configured to be operated by a user's hand, it may also be referred to as a hand-operated brake system. Optionally, the second portion may be configured to receive the first portion such that, when the first portion is fully depressed against the second portion, the exterior surface of the first portion and second portion form a substantially continuous surface. The internal cavity may in some examples be a recess, space, void, aperture, or bore. The first and second portions of the handle may also be referred to as first and second parts of the handle, or upper handle and lower handle respectively. The brake system of the present disclosure may also be a brake system for a wheeled transportation device, such as a wheeled person transportation device, such as a wheelchair, pushchair or perambulator. Optionally, the brake system may be a manually-operated brake system.

Optionally, the first portion of the handle is rotatably coupled to the second portion. Rotational coupling of the first portion to the second portion provides rotational movement of the first portion with respect to the second portion. The rotational movement of the first portion is thereby converted into linear motion of the brake actuator. A rotatably coupled first portion has the advantage of enabling the force applied by the user to be increased by mechanical advantage to overcome the biasing force. As such, a stronger breaking force can be applied to the wheels of the device as it can readily be overcome by the user to disengage the brakes.

Optionally, the first portion of the handle is rotatably coupled to the second portion towards a distal end of the first portion and/or towards a distal end of the second portion. Advantageously, this provides for increased force to be applied to the brake actuator as it enables for the greatest actuator-arm for the brake actuator.

Optionally, the carrier is configured to guide the brake actuator within the cavity and the brake actuator is configured to slide along the cavity. Thus, smoother and more consistent movement of the brake actuator is provided.

Optionally, the carrier is configured to be provided within a chassis member of a wheeled device. A portion of the carrier may be received within the chassis member or substantially the entirety of the carrier may be received within the chassis member. The chassis member of the wheeled device is the structural member, often tubular, of the wheeled device to which a handle is generally affixed. Chassis members may generally form part of the structural members of the wheeled device. A carrier so configured enables the brake system to be integrated with the structural member, thereby providing a more discrete and at least partially hidden brake system. Examples are envisaged wherein the carrier is external to the chassis member and therefore not received within the chassis member.

Optionally, the carrier is generally cylindrical for being received within a tubular chassis member of a wheeled device. Such a carrier may optionally be substantially cylindrical and/or may optionally be configured to have an outer diameter which generally corresponds to the inner diameter of a tubular chassis member to which the brake system is configured to be affixed such that the carrier may be slidingly received by the hollow of the tubular chassis member. A cylindrical carrier is particularly advantageous as it may allow for the carrier to fit within the chassis member while enabling a biasing means to be located therein and is especially advantageous when the biasing means is a spring.

Optionally, the brake actuator biasing means is provided within the internal cavity. Thus, a more compact brake system is provided.

Optionally, the brake system is configured such that progressive movement of the first portion of the handle towards the second portion causes the brake actuator to progressively move towards the brake-disengaged position. Thus, a brake can be progressively disengaged and engaged to precisely control the braking force. In some embodiment, the brake system is configured such that progressive rotation of the first portion of the handle towards the second portion causes the brake actuator to progressively move towards the brake-disengaged position.

Optionally, the brake system is configured such that progressive movement of the first portion of the handle away from the second portion causes the brake actuator to progressively move away from the brake-disengaged position towards the brake-engaged position. Thus, a brake can be progressively disengaged and engaged to precisely control the braking force. In some embodiments, the brake system is configured such that progressive rotation of the first portion of the handle away from the second portion causes the brake actuator to progressively move away from the brake-disengaged position towards the brake-engaged position.

Optionally, the brake actuator biasing means is configured to also bias the first portion of the handle away from the second portion. As well as biasing the brake actuator, the brake actuator biasing means may also be configured to bias the first portion away from the second portion. Thus, the same biasing mechanism or means can be used to perform two functions. Biasing of the first portion of the handle away from the second portion causes the brake to re-engage when a user lets go of the handle and resets the position of the first portion.

Optionally, the brake system further comprises a first portion biasing means for biasing the first portion of the handle away from the second portion. In some examples, a separate first portion biasing means may be provided separate from the brake actuator biasing means.

Optionally, the brake actuator biasing means comprises a compression spring. A tension spring may alternatively be used. Springs are particularly advantageous as they are readily available and cheap, and also can be matched with the width of the internal cavity, for example the diameter of the internal cavity when the internal cavity is generally cylindrical.

Optionally, the first portion biasing means comprises a compression spring. A tension spring may alternatively be used. Springs are particularly advantageous as they are readily available and cheap, and also can be matched with the width of the internal cavity, for example the diameter of the internal cavity when the internal cavity is generally cylindrical.

Optionally, the brake actuator biasing means and the first portion biasing means comprise the same compression spring. Advantageously, the same compression or tension spring can be used for both biasing means, thereby reducing the complexity of the brake system and the number of parts required.

Optionally, the force-transfer means comprises a cam rotationally coupled to the first portion of the handle, and the force-transfer means further comprises a cam follower configured to engage with the cam, the cam follower being coupled to the brake actuator such that movement of the cam follower causes the brake actuator to move along the internal cavity towards and away from the brake disengaged and brake engaged positions. Optionally, the cam follower is coupled to the brake actuator such that movement of the cam follower causes the brake actuator to move along the internal cavity between the brake disengaged and brake engaged positions. Cams are particularly advantageous as they enable the force applied to the first portion of the handle to cause movement of the first portion to be increased, thereby increasing the force available for overcoming the brake actuator biasing force, thereby enabling a greater biasing force to be used and therefore a greater braking force to be provided. Furthermore, by adjusting the cam profile, the force transferred to the brake actuator can be varied according to the cam profile, thereby increasing or decreasing the force required to be applied by the user according to the linear or rotational position of the first portion with respect to the second portion of the handle.

Optionally, the cam is integrally formed with the first portion of the handle. Thus, to facilitate manufacturing for example, the brake actuator and the cam can be provided as one piece.

Optionally, the cam follower is configured to slide within the interval cavity. The cam follower may engage directly with the brake actuator or the brake system may comprise a separate component, such as a spacer, therebetween for transferring movement of the cam follower to the brake actuator.

Optionally, the cam comprises a cam surface having a varying cam profile such that the contact angle between the cam surface and the cam follower is reduced at a first rotational position of the cam than at a second rotational position. A cam comprising a cam surface having a cam profile in this way provides a cam having at least two points on its surface which are at different angles thereby providing different contact angles with the cam follower. Different contact angles cause the angle of the reaction force to be changed so as to produce an increased or decreased moment about the pivot axis of the first portion, thereby varying the effort required to move the first portion towards the second portion at different positions of the first portion with respect to the second portion.

Optionally, the cam profile is shaped such that, at a first rotational position of the cam, the contact angle between the cam surface and the cam follower is such that a reduced force is required to maintain the first portion in a first position than in a second position. Similarly, the cam profile is such that a different force (or moment), for example a reduced or increased force (or moment), is required to maintain the first portion in one position, for example a rotational position, with respect to the second portion than in another.

Optionally, the first position is a fully-depressed position of the first portion and the second position is a fully or partially depressed position of the first portion. It is advantageous that a reduced force is required to maintain the first portion in a fully-depressed position as the user may only need to apply a small, hardly noticeable, force in order to keep the brakes disengaged, thereby reducing grip fatigue of the user.

Optionally, the cam profile is shaped such that the force required to move the first portion towards the second portion increases the further the first portion moves away from the second portion. For example, the force required may progressively increase the further the first portion moves, for example rotates, away from the second portion. This has the advantage that less and less force is required to be applied by the user to the first portion in order to progressively disengage the brakes.

Optionally, the force-transfer means comprises a crank configured to convert rotational movement of the first portion of the handle to linear motion of the brake actuator within the internal cavity. A crank is a simple, reliable and convenient way of transferring force or movement of the first portion of the handle to the brake actuator.

Optionally, the brake actuator comprises brake cable coupling means for coupling the brake actuator to a brake cable for pulling on said brake cable. Enabling a brake cable to be used with the present disclosure in this way provides for a simple and familiar means of actuating a brake.

Optionally, the brake actuator comprises a recess for receiving an anchor or nipple of the end of a brake cable. An anchor, such as a nipple or barrel or cylinder as are commonly affixed to the end of such brake cables, provides a convenient means for coupling the end of the brake cable to the brake actuator to enable the brake actuator to pull on the brake cable.

Optionally, the carrier comprises brake-cable sheath receiving means for receiving a brake-cable sheath. The brake-cable sheath receiving means may act as an anchor point for the brake-cable sheath, so as to enable relative movement of the brake cable with respect to the brake-cable sheath.

Optionally, the carrier comprises the brake-cable sheath receiving means at a distal end thereof. Thus, internal routing of the brake-cable through a structural member of the wheeled device is enabled.

Optionally, the brake-cable sheath receiving means is configured to receive an adjuster of a brake-cable sheath for adjusting the length of the brake-cable sheath. Thus, the brake system provides for means for adjusting the cable tension and therefore the braking force.

Optionally, the compression spring is provided within the internal cavity between the brake actuator and the brake-cable sheath receiving means and wherein the compression spring is generally longitudinally aligned with the longitudinal axis of the internal cavity. Such a configuration provides for a particularly compact brake system and enables parts of the brake system to be located within the chassis member of the device such that the brake system may be said to be integrated with the chassis member of the device.

Optionally, a biasing means other than a compression spring could also be provided within the internal cavity between the brake actuator and the brake-cable sheath receiving means.

Optionally, the brake actuator biasing means is configured to apply a biasing force to the brake actuator for biasing the brake actuator away from the brake-cable sheath receiving means.

Optionally, the brake system comprises a brake for braking a wheel of the device.

Optionally, the brake system is configured such that progressive rotation of the first portion of the handle towards the second portion causes the brake to progressively disengage.

Optionally, the brake system comprises a brake-cable received by the brake actuator and a brake-cable sheath is arranged around a length of the brake cable, wherein the brake-cable sheath is received by the brake-cable sheath receiving means.

Optionally, the force-transfer means is configured such that movement of the first portion of the handle towards the second portion causes force applied to the first portion to be transferred to the brake actuator so as to move the brake actuator towards the brake-cable sheath receiving means, against the biasing force. Biasing the brake actuator away from the brake-cable sheath receiving means applies tension to a brake cable when a brake cable is received by the brake actuator for causing a brake to engage.

Optionally, the brake-cable sheath receiving means is configured such that, in use, the brake-cable sheath is routed through a chassis member of a device. Thus, the brake system is configured to provide for an internally routed brake cable, thereby providing a more compact and less obstructive brake system.

Optionally, the handle comprises a finger support configured to engage at least one finger of a user to prevent a user's hand from slipping off of the handle. Optionally, the second portion of the handle comprises the finger support. Thus, means are provided for preventing a user's hand from slipping off the handle.

Optionally, the finger support comprises a recess configured to receive the little finger of a user. Engaging the little finger provides for a finger support which is able to prevent the entire user's hand from slipping backwards off of the handle by engaging only the little finger, and not necessarily the rest of the user's hand, thereby providing for a simpler, more compact means of ensuring the user's hand does not slip from the handle.

Optionally, the brake system comprises a rotation limiter for limiting the extent to which the first portion of the handle is rotatable away from the second portion, the rotation limiter being configured to be rotatable independently of the first portion of the handle and the rotation limiter comprising a stop configured to abut against a portion of the handle for limiting the extent of rotation of the first portion, the rotation limiter comprising locking means for rotationally locking the rotation limiter to the first portion of the handle. Thus, the rotation limiter may be referred to as a brake override as it may be configured to maintain the first portion of the handle at one or more pre-determined positions, thereby maintaining the brake actuator, and thereby the brake, at one or more pre-determined positions. One of said positions may optionally be a brake fully-disengaged position. Another of said positions may be a brake fully-engaged position. The locking means may be rotatable from at least one pre-determined position to another. Optionally, the rotation limiter may comprise a resilient portion for enabling the rotation limiter to be moved (e.g. rotated) relative to the first portion of the handle between pre-determined locking positions of the first portion.

Optionally, the locking means comprises at least one locking protrusion and at least one locking recess configured to engage with the at least one locking protrusion, the at least one locking protrusion and at least one locking recess being configured such that, when engaged with each other, rotation of the first portion of the handle with respect to the second portion is prevented. Thus, a simple and effective locking means is provided.

Optionally, the first portion of the handle comprises one of the at least one protrusions or the at least one recesses, and the rotation limiter comprises the other. Optionally, whichever of the at least one recesses and the at least one protrusions is provided on the rotation limiter may be provided on a resilient portion of the rotation limiter, the resilient portion being configured such that the resilient portion flexes so as to enable the at least one protrusion to disengage from its respective recess and to engage with an adjacent recess upon rotation of the rotation limiter.

Optionally, the wheeled device is a person transportation device, such as a wheelchair or pushchair.

According to a second aspect of the present disclosure, there is provided a brake system for use with a wheeled device, the brake system comprising:

a handle comprising a first portion and a second portion, wherein the first portion is moveably coupled to the second portion;

the first portion comprising brake cable receiving means for receiving a first end of a brake cable for pulling on the first end of the brake cable;

a brake actuator for actuating a brake;

brake actuator biasing means configured to apply a biasing force to the brake actuator for biasing the brake actuator to a brake-engaged position;

the brake actuator comprising brake cable receiving means for receiving a second end of the brake cable for pulling on the second end of the brake cable;

the brake actuator being configured such that, when a first end of a brake cable is received in the brake cable receiving means of the first portion and a second end of the brake cable is received in the brake cable receiving means of the brake actuator, movement of the first portion towards the second portion causes the brake actuator to move against the biasing force to a brake-disengaged position.

Optionally, the first portion of the handle is rotatably coupled to the second portion. Rotational coupling of the first portion to the second portion provides rotational movement of the first portion with respect to the second portion. The rotational movement of the first portion is thereby converted into linear motion of the brake actuator. A rotatably coupled first portion has the advantage of enabling the force applied by the user to be increased by mechanical advantage to overcome the biasing force. As such, as stronger breaking force can be applied to the wheels of the device as it can readily be overcome by the user to disengage the brakes.

Optionally, the first portion of the handle is rotatably coupled to the second portion towards a distal end of the first portion and/or towards a distal end of the second portion. Advantageously, this provides for increased force to be applied to the brake actuator as it enables for the greatest actuator-arm for the brake actuator.

Optionally, the second portion comprises an internal passageway for slidably receiving a brake cable. The internal passageway may be an integral internal passageway. Thus, the passageway serves as a guiding means for guiding the sliding movement of a brake cable therealong. Advantageously this provides for a more discreet, compact and hidden brake system. The brake cable sheath may then be routed along the exterior of a chassis member or may in some embodiments be internally routed.

Optionally, the second portion comprises a brake cable sheath receiving means. Optionally, the brake cable sheath may be provided at a distal end of the handle, for example at the end distal to the first portion rotatable coupling.

Optionally, the brake cable receiving means comprises a recess provided in the first portion for receiving a brake cable anchor provided at the end of a brake cable. Such an anchor may be a barrel or cylinder, brake cable nipple or other such fixing commonly provided at the end of a brake cable and, as such, the recess may accordingly be configured to receive such fixings. The brake cable receiving means may also be referred to as a brake cable coupling means or a brake cable affixing means as it is configured to couple with a brake cable such that the brake cable is affixed to the first portion such that movement of the first portion, such as rotation, causes the end of the brake cable to be pulled (that is, to apply tension to the brake cable), for example for pulling on an actuator of a brake.

Optionally, the first portion comprises an internal passageway for receiving a brake cable. The internal passageway may be an integral internal passageway. Thus, when a brake cable is received in the bake cable receiving means of the first portion, the brake cable may be internally routed through a part of the first portion and may then be internally routed through the internal passageway of the second portion, thereby providing a discreet, compact and hidden brake system.

Optionally, the first portion is coupled to a first end of a brake cable for pulling on the first end of the brake cable and a second end of the brake cable is received in the brake cable receiving means of the brake actuator.

Optionally, the brake system is configured such that progressive movement of the first portion of the handle towards the second portion causes the brake actuator to progressively move towards the brake-disengaged position. Thus, a brake can be progressively disengaged and engaged to precisely control the braking force. In some embodiment, the brake system is configured such that progressive rotation of the first portion of the handle towards the second portion causes the brake actuator to progressively move towards the brake-disengaged position.

Optionally, the brake system is configured such that progressive movement of the first portion of the handle away from the second portion causes the brake actuator to progressively move away from the brake-disengaged position towards the brake-engaged position. Thus, a brake can be progressively disengaged and engaged to precisely control the braking force. In some embodiments, the brake system is configured such that progressive rotation of the first portion of the handle away from the second portion causes the brake actuator to progressively move away from the brake-disengaged position towards the brake-engaged position.

Optionally, the brake actuator biasing means is configured to also bias the first portion of the handle away from the second portion. As well as biasing the brake actuator, the brake actuator biasing means may also be configured to bias the first portion away from the second portion. Thus, the same biasing mechanism or means can be used to perform two functions. Biasing of the first portion of the handle away from the second portion causes the brake to re-engage when a user lets go of the handle.

Optionally, the brake system further comprises a first portion biasing means for biasing the first portion of the handle away from the second portion. In some examples, a first portion biasing means may be provided separate from the brake actuator biasing means.

Optionally, the brake actuator biasing means comprises a compression spring. A tension spring may alternatively be used. Springs are particularly advantageous as they are readily available and cheap, and also can be matched with the width of the internal cavity, for example the diameter of the internal cavity when the internal cavity is generally cylindrical.

Optionally, the first portion biasing means comprises a compression spring. A tension spring may alternatively be used. Springs are particularly advantageous as they are readily available and cheap, and also can be matched with the width of the internal cavity, for example the diameter of the internal cavity when the internal cavity is generally cylindrical.

Optionally, the brake actuator biasing means and the first portion biasing means comprise the same compression spring. Advantageously, the same compression or tension spring can be used for both biasing means, thereby reducing the complexity of the brake system and the number of parts required.

Optionally, the brake actuator comprises a recess for receiving a nipple or anchor of the end of a brake cable. An anchor, such as a nipple or barrel or cylinder as are commonly affixed to the end of such brake cables, provides a convenient means for coupling the end of the brake cable to the brake actuator to enable the brake actuator to pull on the brake cable.

Optionally, the brake-cable sheath receiving means is configured to receive an adjuster of a brake-cable sheath for adjusting the length of the brake-cable sheath. Thus, the brake system provides for means for adjusting the cable tension and therefore the braking force.

Optionally, the brake system comprises a brake for braking a wheel of the device.

Optionally, the brake system is configured such that progressive rotation of the first portion of the handle towards the second portion causes the brake to progressively disengage.

Optionally, the brake system comprises a brake-cable received by the brake actuator and a brake-cable sheath is arranged around a length of the brake cable, wherein the brake-cable sheath is received by the brake-cable sheath receiving means.

Optionally, the brake-cable sheath receiving means is configured such that, in use, the brake-cable sheath is routed through a chassis member of a device. Thus, the brake system is configured to provide for an internally routed brake cable, thereby providing a more compact and less obstructive device.

Optionally, the handle comprises a finger support configured to engage at least one finger of a user to prevent a user's hand from slipping off of the handle. Optionally, the second portion of the handle comprises the finger support. Thus, means are provided for preventing a user's hand from slipping off the handle.

Optionally, the finger support comprises a recess configured to receive the little finger of a user. Engaging the little finger provides for a finger support which is able to prevent the entire user's hand from slipping backwards off of the handle by engaging only the little finger, and not necessarily the rest of the user's hand, thereby providing for a simpler, more compact means of ensuring the user's hand does not slip from the handle.

Optionally, the brake system comprises a rotation limiter for limiting the extent to which the first portion of the handle is rotatable away from the second portion, the rotation limiter being configured to be rotatable independently of the first portion of the handle and the rotation limiter comprising a stop configured to abut against a portion of the handle for limiting the extent of rotation of the first portion, the rotation limiter comprising locking means for rotationally locking the rotation limiter to the first portion of the handle. Thus, the rotation limiter may be referred to as a brake override as it may be configured to maintain the first portion of the handle at one or more pre-determined positions, thereby maintaining the brake actuator, and thereby the brake, at one or more pre-determined positions. One of said positions may optionally be a brake fully-disengaged position. Another of said positions may be a brake fully-engaged position. The locking means may be rotatable from at least one pre-determined position to another. Optionally, the rotation limiter may comprise a resilient portion for enabling the rotation limiter to be moved (e.g. rotated) relative to the first portion of the handle between pre-determined locking positions of the first portion.

Optionally, the locking means comprises at least one locking protrusion and at least one locking recess configured to engage with the at least one locking protrusion, the at least one locking protrusion and at least one locking recess being configured such that, when engaged with each other, rotation of the first portion of the handle with respect to the second portion is prevented. Thus, a simple and effective locking means is provided.

Optionally, the first portion of the handle comprises one of the at least one protrusions or the at least one recesses, and the rotation limiter comprises the other. Optionally, whichever of the at least one recesses and the at least one protrusions is provided on the rotation limiter may be provided on a resilient portion of the rotation limiter, the resilient portion being configured such that the resilient portion flexes so as to enable the at least one protrusion to disengage from its respective recess and to engage with an adjacent recess upon rotation of the rotation limiter.

According to a third aspect of the present disclosure, there is provided a wheeled device, such as a wheelchair, comprising the brake system according to the first or second aspect of the invention.

According to a fourth aspect of the present disclosure, there is provided a brake system substantially as described herein with reference to the accompanying drawings.

According to a fifth aspect of the present disclosure, there is provided a handle for a wheeled person transportation device, the handle comprising;
  a finger support for receiving a finger of a user, wherein the finger support is configured to support a user's finger such that a user's hand is prevented from slipping off of a distal end of the handle. Optionally, the distal end is a rear end of the handle.

Thus, a user's hand is prevented from slipping off of the handle. It is envisaged that the features of this handle and the finger support could in some embodiment be used with the brake system of the present disclosure.

Optionally, a second distal end of the handle, opposed to the first distal end, comprises mounting means for mounting the handle to a chassis member of the wheeled person transportation device. Optionally, the second distal end is a front end of the handle.

Optionally, the finger support is configured to engage the side of a user's finger.

Optionally, the finger support comprises a hooked portion configured to engage with the side of a user's finger.

Optionally, the hooked portion comprises a side portion configured to extend generally outwardly from the handle, wherein the side portion is configured to engage a side of a user's hand, and a top portion, extending from the side portion, wherein the top portion is configured to contact the backside of a user's finger.

According to a sixth aspect of the present disclosure, there is provided a person transportation device comprising a brake system substantially as described herein with reference to the accompanying drawings.

According to a seventh aspect of the present disclosure, there is provided a handle substantially as described herein with reference to the accompanying drawings.

BRIEF DESCRIPTION OF THE DRAWINGS

The present disclosure may be carried out in various ways and a preferred embodiment of a brake system in accordance with the disclosure will now be described by way of example with reference to the accompanying drawings, in which:

FIG. 2 is a view of the main outer components of the current disclosure with no pressure on the lever, with the lever up, and the brake on.

FIG. 5 is a side view cross section of the internal mechanical details with no pressure on the lever, with the lever up, and the brake on.

FIG. 7 is a side view cross section of the internal mechanical details of an alternative embodiment of the force transfer means with no pressure on the lever, with the lever up, and the brake on.

DETAILED DESCRIPTION

The present disclosure is configured to have, but is not limited to, four distinct features or modes of braking, that, to ensure safe operation, are seamlessly linked by the user's chosen input and adjustment of the unique integrated handle grip levers. Modes include, but are not limited to, or by, any number of the following:

1. Hands on. First portion of handle is rotated into the 'down' position by user, and brake is released.
2. Hands off. Pressure is released on the first portion of the handle, allowing spring extension pressure to rotate it and apply brake.
3. Hands on. First portion of the handle is between 1 and 2, with graduated input from the user, varying the rotation of the first portion of the handle to vary the braking.
4. Override 'freewheel' mode for use in safe and exceptional circumstances, where rotation limiter locks the first portion of the handle down to enable product adjustment, repair, packing, rolling or transporting.

Modes 1-3 as described above are all user modes, whereby for safety reasons the user must have their hands on the control grips to facilitate, adjust, or allow rotational movement or the operation of an attached wheeled device.

Although primarily designed for hands free, failsafe mechanical braking for manual wheelchairs, powered wheelchairs, and other medical devices such as scooters, the current disclosure is also designed to physically connect the user or operator to any suitable device, to ensure that if hands are removed from said device it will stop rotating, brake, or come to a standstill and shut down safely.

Unlike a simple failsafe switch which is well known in prior art, it is considered particularly advantageous of the present disclosure that, without added external energy sources, the output forces and energy exerted by the brake system far exceeds the perceived user input on the swivelling handle.

Mode 4 is operated by an override lever, or rotation limiter, allowing the first portion of the handle to be held in the locked down position for use in special conditions. The override lever is positioned in such a way that as soon as the operator grasps the handle to operate the vehicle or machinery, it flips back down to re-engage the brake.

Figure 1:
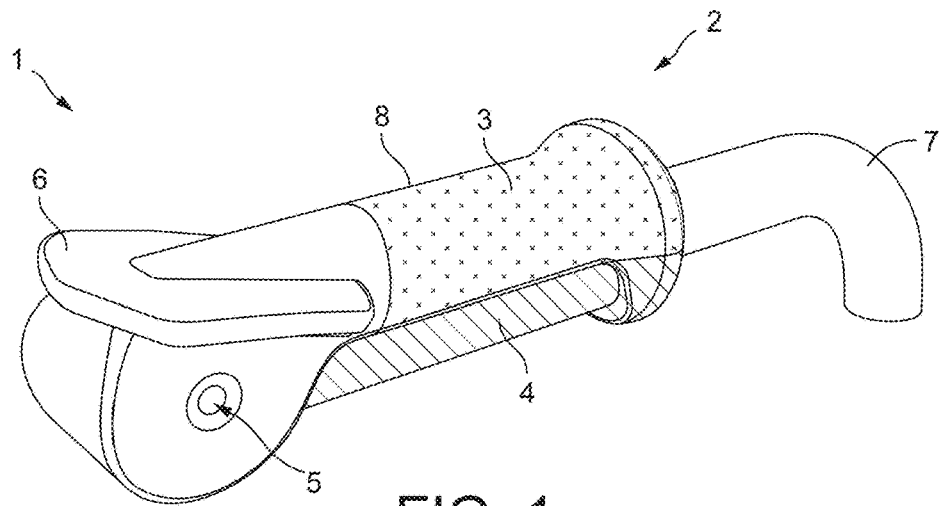
FIG. 1 is a view of the main outer components of the current disclosure with the brake lever held down as in use, and brake off.

An example of a brake system for use with a wheel device is shown in FIG. 1. The brake system 1 comprises a handle 2 comprising a first portion 3 and a second portion 4. The first portion 3 is rotatably coupled to the second portion 4. In the position shown in FIG. 1, the first portion 3 is in the fully-depressed position which corresponds to a brake fully-disengaged position in which a brake for braking a wheeled device (such as a person transport device or vehicle) is fully disengaged, allowing the wheeled device to which the brake system is attachable to freewheel. The first portion 3 is moveable away from the second portion 4 and the brake system is configured such that, when the first portion 3 is moved away from the second portion 4, the brake system causes a progressively increasing braking force to be applied to the wheeled device. Conversely, the brake system is also configured such that when the first portion 3 is moved towards the second portion, the brake system causes a progressively decreasing braking force to be applied to the wheeled device.

In some examples, the second portion 4 and the first portion 3 may be shaped such that when the first portion 3 is in the fully-disengaged position shown in FIG. 1, the first portion 3 is received by the second portion 4 such that the exterior surface of the first portion 3 is substantially flush with the exterior surface of the second portion 4 so as to form a substantially continuous exterior surface of the second portion 4 and the first portion 3. The substantially continuous exterior surface may optionally be generally or substantially cylindrical.

Figure 2:
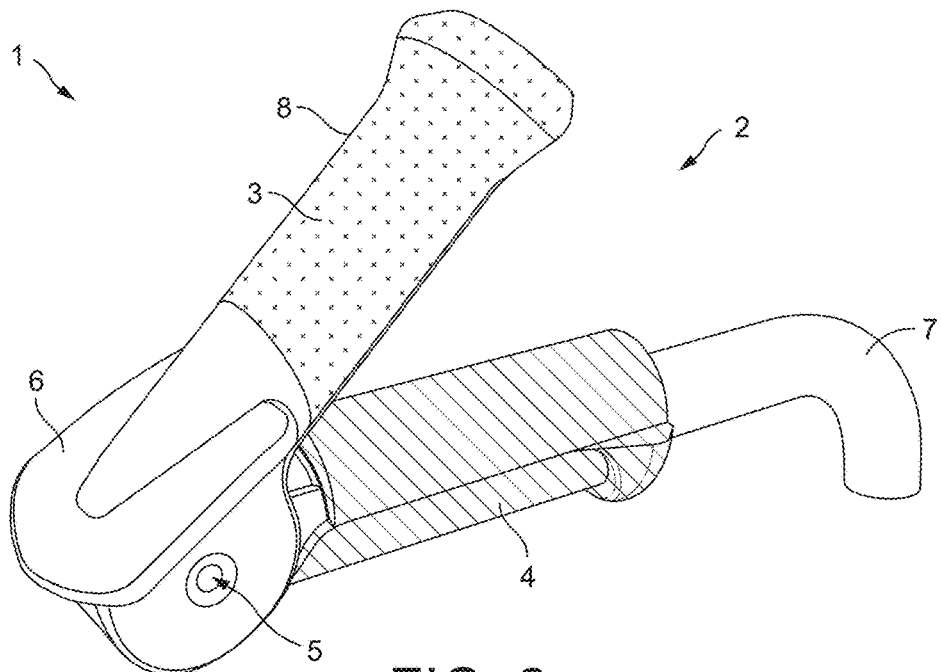

In the example shown, the first portion 3 (which, as in the embodiment shown, the first portion 3 comprises a brake lever 8, may also be referred to as a brake lever 8) is rotatably coupled to the second portion 4 about rotation axis 5. In the example shown, the brake lever 8 is rotatably coupled to the second portion 4 at a distal end of both of the brake lever 8 and the second portion 4, although other configurations are equally envisaged, such as the brake lever 8 being rotatably coupled at its distal end to a proximal of end of second portion 4 of handle 2, or to part-way along the length of the second portion 4, or anywhere else along its length. Indeed, examples wherein the first portion 3 does not comprises a brake lever 8 but instead comprises a button or other such means configured for linear movement are also envisaged. In the example shown, the first portion 3 is rotatable towards and away from the second portion 4 about axis 5. The first portion 3 is shown in FIG. 2 as having rotated away from the second portion 4 to a brake-engaged position in which the system is configured to cause a braking force to be applied to the wheeled device. In the example shown, the rotatable coupling between the first portion 3 and the second portion 4 is provided by hinge 26.

The handle 2 is shown as being affixed to the end of a chassis member 7 of the wheeled device. In the example shown in FIG. 1, the chassis member 7 is substantially tubular and is a structural member of the wheeled device. The chassis member 7 is the part of the wheeled device to which a handle is generally or typically attached and is the portion of the wheeled device which is used to transmit motive force from the user pushing the wheeled device to the rest of the wheeled device. The brake system 1 of the present disclosure may be provided affixed to a wheeled device or maybe retrofitted to a chassis member 7 of an existing wheeled device. The chassis member may also be referred to as a handle mounting tube as it is a tube to which a handle is typically or generally mounted.

Figure 3:
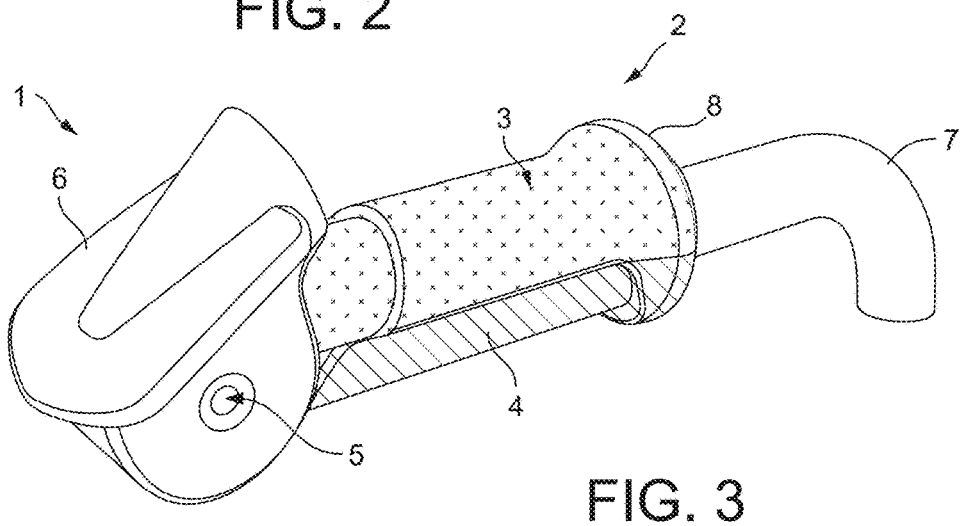
FIG. 3 is a view of the main outer components of the current-disclosure with the rotation limited deployed to maintain the brake lever in fully depressed position such that the brake system is maintained in a fully-disengaged position.

A rotation limiter 6, which may also be referred to as a brake override, is rotatably coupled to a distal end of the first portion 3 of the handle 2. The rotation limiter 6 is configured to limit the extent of rotation of the first portion 3 and may comprise locking means for rotationally locking the first portion 3 with respect to the second portion 4, for example in at least one pre-determined position. In FIG. 3, the rotation limiter 6 is shown rotated away from the first portion 3 in an engaged position thus, as the rotation limiter 6 has been engaged when the first portion 3 is fully depressed, the first portion 3 is rotationally locked in a fully-depressed position and therefore the first portion 3 is locked in a brake fully-disengaged position, enabling the wheeled device to freewheel. In the example shown, the rotation limiter 6 is rotatable independently of the first portion 3 but is configured to rotate about the same axis of rotation, axis 5. When the rotation limiter 6 is disengaged, it may rotate with the first portion 3 as the first portion 3 is raised and lowered with respect to the second portion, however, when the rotation limiter 6 is engaged by pivoting it away from the first portion 3, it causes the first portion 3 to be maintained in a predetermined rotational position with respect to the second portion 4.

Figure 4:
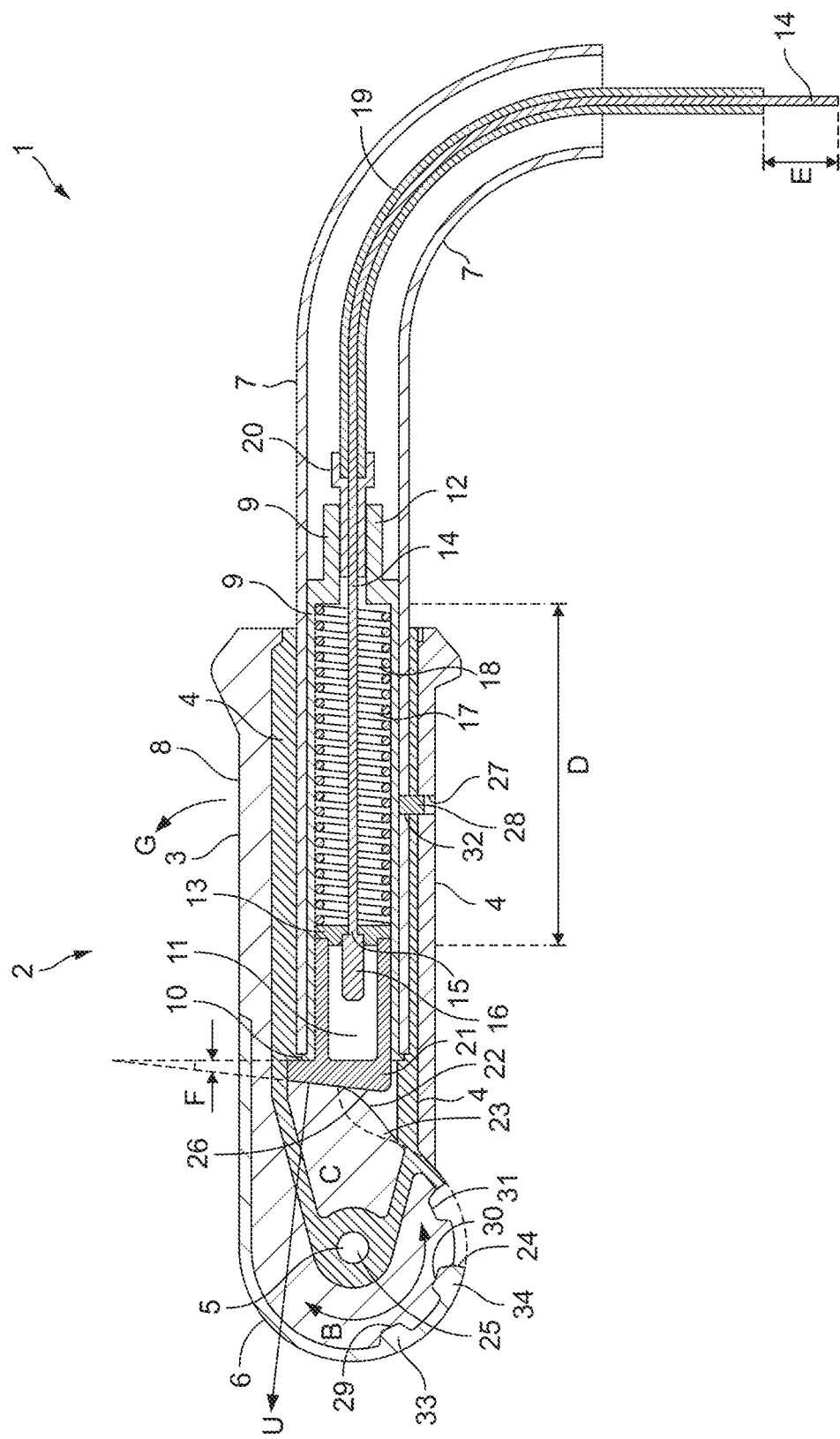
FIG. 4 is a side view cross section of the internal mechanical details with the brake lever held down as in use, and the brake system in a brake disengaged configuration.
Figure 5:
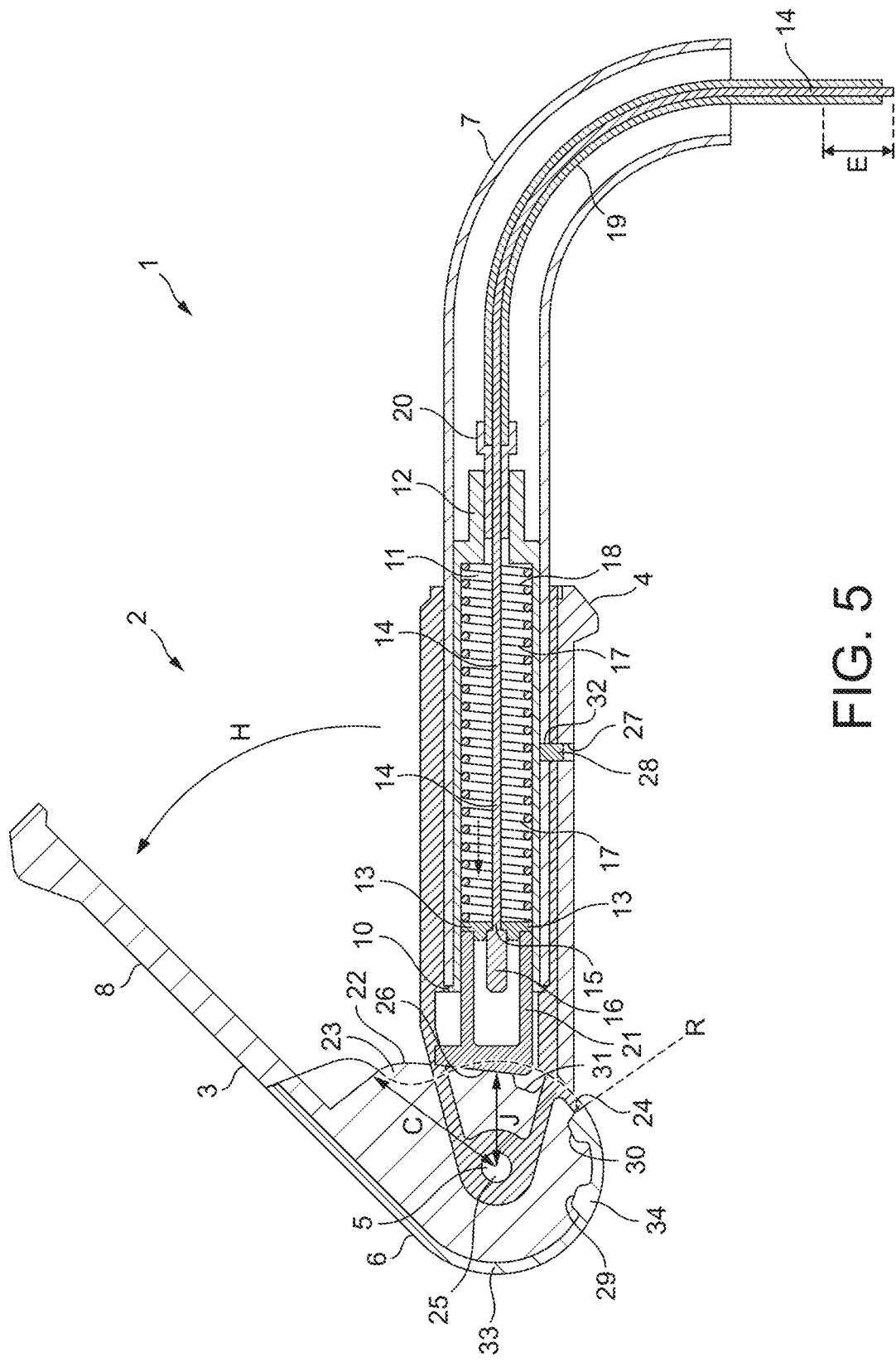

FIGS. 4 and 5 show a cross-sectional view of the brake system shown in FIGS. 1 to 3 in a brake disengaged configuration and a brake engaged configuration respectively.

A carrier 9 is slidingly received within the end of tubular chassis member 7 such that an external shoulder 10 abuts against the end face of the chassis member 7, thereby preventing further movement of the carrier 9 into the end of the tubular chassis member 7. Carrier 9 is generally cylindrical so as to fit within the tubular chassis member 7, however any other suitable shape for being received within the tubular chassis member 7 could instead be used. Carrier 9 comprises an internal cavity 11 (which also may be referred to as a recess, void, space, aperture or bore) and a brake-cable sheath retaining means 12 configured to retain a brake cable sheath, such as those commonly known in the art. The brake-cable sheath retaining means 12 is provided at a proximal end of the carrier 9, although examples are envisaged wherein this is not the case. In the example shown, the brake-cable sheath retaining means 12 comprises an aperture configured to receive a brake cable tension adjuster 20 for adjusting the tension in a brake cable 14, although other brake-cable sheath retaining means are envisaged.

A brake actuator 13, configured to receive a brake cable and configured to apply tension to the brake cable, is slidingly received within the internal cavity 11 such that the brake actuator 13 is slidable along the length of the internal cavity 11. The brake actuator 13 comprises brake-cable retaining means 15 for retaining a brake cable. In the example shown, the brake actuator 13 comprises a generally flat circular disc and the brake-cable retaining means 15 comprises a recess 15 provided in a planar face of the circular disc for receiving a nipple 16 affixed to the end of a brake cable 14.

A brake actuator biasing means 17 is provided within the internal cavity 11. The brake actuator biasing means 17 is configured to apply a biasing force to the brake actuator 13 to bias the brake actuator away from the brake-cable sheath retaining means 15, thereby applying tension to the brake cable 14 for actuating a brake. In the example shown, the brake actuator biasing means comprises a compression spring 17 arranged such that the longitudinal axis thereof is generally aligned with the longitudinal axis of the internal cavity 11, although other suitable means for biasing the brake actuator away from the brake-cable sheath retaining means 15 other than a compression spring 17 could equally be used, such as a tension spring or any other suitable means. The compression spring 17 is sized so as to fit within the internal cavity 11 of the carrier 9 such that the external diameter of the compression spring 17 is generally the same diameter as the internal cavity 11, or slightly smaller so as to enable the compression spring 17 to freely move within the internal cavity 11. Carrier 9 is configured such that brake cable 14 is fed from the brake actuator 13, passing through the annular space 18 within the compression spring 17, to the brake-cable sheath retaining means 15. From there, the brake cable 14 and the brake cable sheath 19 are routed through the hollow of the tubular chassis member 7 and onwards to a brake.

The first portion 3 comprises a force-transfer means for transferring force applied from the first portion 3 to the brake actuator 13. In the example shown the force-transfer means comprises a cam 22 which is rotatably coupled to the first portion 3 and in some examples may be integrally formed with the first portion 3. Thus, rotation of the first portion 3 with respect to the second portion 4 causes the cam 22 to also rotate therewith. Cam 22 defines a cam profile 23 or cam surface 23 for engaging with a cam follower 21.

A cam follower 21 is configured to slidingly engage with the cam surface 23 such that rotation of the cam 22 causes linear motion of the cam follower 21 within the internal cavity 11 of carrier 9. As such, cam follower 21 comprises an angled cam-follower surface 26 (as indicated by arrow F). The cam follower 21 is configured to slide along a length of the internal cavity 11 so as to engage with the brake actuator 13. The cam follower 21 may thus also be referred to as a piston. Embodiments are envisaged wherein the cam follower 21 and brake actuator 13 are integrally formed. Thus, when the first portion 3 of the handle 2 is rotated towards the second portion 4, cam 22 rotates and causes the cam follower 21 to slide within the internal cavity, or bore, 11 of the carrier 9 so as to act against the brake actuator 13, thereby pushing the brake actuator 13 against the biasing force of the brake actuator biasing means 17 and, in the example shown, compressing compression spring 17. Thus, the brake system 1 is configured such that rotation of the first portion 3 causes cam follower 21 to move the brake actuator 13 towards the brake-cable sheath retaining means 12, overcoming the biasing force provided by the brake actuator biasing means 17, thereby reducing the tension in the brake cable 14 for disengaging a brake.

Turning now to FIG. 5, when a user releases the handle and thereby allows first portion 3 to rotate with respect to second portion 4, the force compressing the compression spring 17 is released. FIG. 5 shows the brake device 1 in a configuration in which the user's hand is released from the handle and therefore has moved from the brake disengaged configuration of FIG. 4 to the brake engaged configuration shown in FIG. 5. The brake actuator biasing means 17 therefore pushes the brake actuator 13 away from the brake-cable sheath retaining means 12 (as indicated by arrow I), pulling brake cable 14 through flexible outer sheath 19 (as indicated by arrow E), thereby increasing the tension in the brake cable 14, and thereby re-engaging a brake.

As the brake actuator 13 moves (and in this example slides, although other configurations are envisaged) along the internal cavity 11 of the carrier 9 (i.e. away from the brake-cable sheath retaining means 12), the brake actuator 13 (which may be referred to a brake-cable puller 13) pushes against the cam follower 21, causing the angled surface 23 of the cam follower 21 to push against the cam surface 23, resulting in a reaction force U (see FIG. 4) which produces a moment B on the cam 22, thereby causing the cam 22 to rotate about axis 5 and thereby causing the first portion 3 to also rotate, as indicated by arrow H and about axis 5, away from the second portion 4 to the raised position shown in FIG. 5, that is until a stop 24 provided on the rotation limiter 6 engages a portion of the section portion 4 preventing further rotation of the first portion 3. Thus, the brake actuator biasing means 17 also serves to bias the first portion 3 to a raised or brake disengaged position and therefore may also be referred to as a first portion biasing means for biasing the first portion 3 away from the second portion 4. It is envisaged that in certain examples, a separate brake actuator biasing means may be provided to the brake actuator biasing means 17.

The cam 22 comprises a cam profile 23 which varies in height from the rotational axis 5 (i.e. from the hinge 25), according to the rotation position of the cam 22. The cam profile 23 varies in height from its highest profile (see arrow C of FIGS. 4 and 5) in the brake fully-disengaged position shown in FIG. 4 to its lowest profile (see arrow J of FIG. 5) in the brake fully-engaged position shown in FIG. 5. When the cam 22 is in the fully-disengaged position, the cam 22 presents its highest cam profile 23 to the cam follower 21 such that the cam follower 21 is moved to its greatest distance from rotation axis 5 and to its furthest position along the internal cavity 11 of the carrier 9, such that the brake actuator 13 is at its brake fully-disengaged position (i.e. such that the brake actuator 13 is at its closest position to the brake-cable sheath receiving means) such that the length of brake-cable 14 exposed from the brake-cable sheath 19 is at a minimum. In contrast, when the cam 22 is in the fully-brake engaged position, the cam 22 presents its lowest cam profile 23 to the cam follower 21 such that the cam follower 21 is moved to its least distance from rotation axis 5 and such that the brake actuator 13 is at its brake full-engaged position (i.e. such that the brake cable puller 11 is at its furthest position from the brake-cable sheath receiving means) such that the length of brake cable 14 exposed from the brake-cable sheath 19 is at a maximum. The distance the brake cable 14 is pulled is therefore equal to the difference between the cam profile height in the disengaged position and the engaged position (i.e. the length of arrow C minus the length of arrow J).

The cam profile 23 is shaped such that, at the fully-disengaged position, it substantially corresponds with the angle of the angled surface 23 of the cam follower 21. The angle of contact between the cam surface 23 and the crown of the cam-follower 21, as indicated by arrow F, determines the biasing force for biasing the first portion 3 away from the second portion 4. As can be seen in FIG. 4, this angle in the brake fully-disengaged position is smaller than the angle in the brake fully-engaged position shown in FIG. 5, thus the brake actuator biasing means 17 is configured such that the biasing force varies according to the position of the brake actuator 13. Although other examples are envisaged, in the example shown, the biasing force is reduced in the brake fully-disengaged position than in the brake fully-engaged position. Thus, the user requires a reduced force to maintain the first portion 3 in the fully-depressed position. The cam profile 23 is shaped such that the user requires greater force to rotate the first portion 3 towards the section portion 4 as the first portion 3 rotates away from the second portion 4.

To prevent axial or rotational movement of the handle 2 with respect to the chassis member 7, the second portion 4 comprises mounting means for axially and rotationally mounting the handle 2 to the chassis member 7 of the wheeled device. In the example shown, the second portion 4 comprises an aperture 27 configured to receive a grub screw 28. When the second portion 4 is mounted to a chassis member 7, the aperture 27 is configured to align with a corresponding aperture 32 provided in the chassis member 7, such that grub screw 28 passes through and extends between both apertures, thereby rotationally and axially locking the handle 2 to the chassis member 7. Thus, grub screw 28 enables the brake system 1 to be easily retrofitted to an existing push-member and for the entire brake system 1 to be removed from the end of the chassis member 7, for example for replacement or easy maintenance of the brake system 1. Grub screw 28 may optionally also extend entirely through the aperture 32 of the chassis member 7 so as to engage with the carrier 9, thereby also rotationally and axially locking the carrier 9 to the handle 2 and/or chassis member 7 due to the frictional force applied by the grub screw 28 to external surface of the carrier 9 (but equally, the carrier may also comprise an aperture for receiving the grub screw 28).

In some embodiments, a rotation limiter or brake override 6 may be optionally provided. Details of the brake override 6 can be seen in FIG. 6. Rotation limiter 6 is rotatable about axis 5 and, as such, is rotatably coupled to hinge 26, such that the rotation limiter is rotatable with respect to the first portion 3 and the second portion 4. Rotation limiter 6 comprises a generally arcuate portion 33 configured to receive the generally arcuate end of the first portion 3 so as to be rotatable thereabout. Rotation limiter 6 further comprises a cup portion 34 configured to receive a portion of the first portion 3 proximal to the generally arcuate portion of the first portion 3 such that, when the first portion 3 is received by the rotation limiter 6, the rotation limiter 6 lies substantially flush against the first portion 3 so as to form a generally continuous surface therewith.

Rotation limiter 6 is configured to define a plurality of predetermined locking positions for locking the first portion 3 in a plurality of corresponding rotational positions relative to the second portion 4. In the example shown, the rotation limiter 6 is configured to define two predetermined locking positions, however the rotation limiter 6 may be configured to define a single locking position or three, four, five, six or more locking positions. In the example shown, the first portion 3 comprises three locking recesses 28, 29, 30 defining two pre-determined locking positions. The rotation limiter 6 comprises two locking protrusions 34 configured to engage with the locking recesses 28, 29, 30 for selectively rotationally coupling the rotation limiter 6 to the first portion 3 at two rotational positions with respect to the first portion 3, and thereby for defining two predetermined rotational positions of the first portion 3 with respect to the second portion 4.

Figure 6:
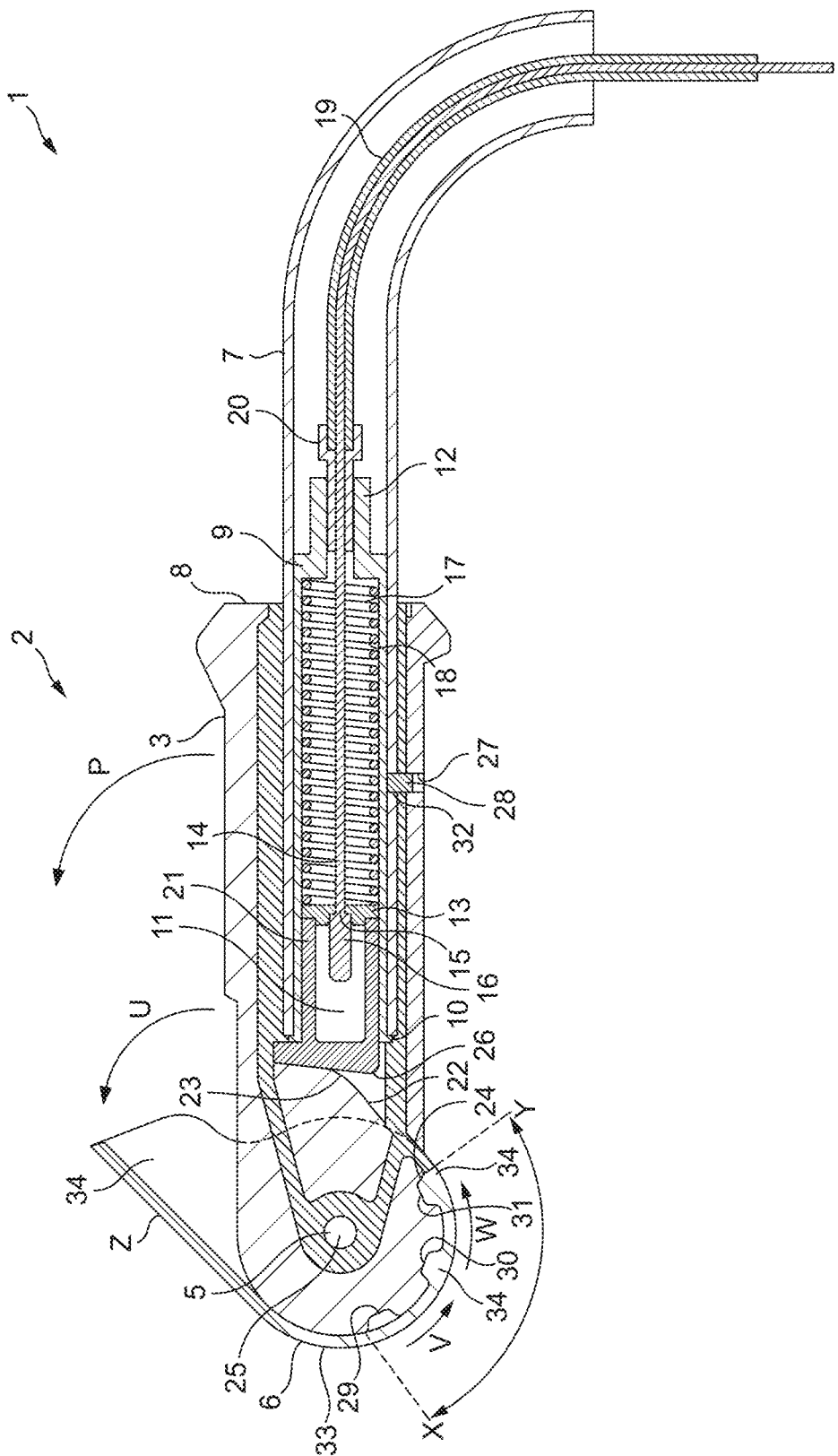
FIG. 6 is a side view cross section of the internal mechanical details with the rotation limiter deployed.

By comparing the position of the rotation limiter 6 with respect to the brake actuator 3 in FIGS. 5 and 6, it can be seen that, in FIG. 5, the two locking protrusions 34 are received by a first 29 and a second 30 locking recess, the second locking recess being adjacent to the first, leaving the third locking recess 31 free of any locking protrusions 34. In this position of the rotation limiter 6, stop 24 is coupled to the first portion 3 in a locking position furthest away from the second portion 4, thereby preventing the first portion 3 from over rotating away from the second portion 4 as stop 24 engages handle housing 4 (as shown by point R in FIG. 5). Turning now to FIG. 6, it can be seen that the rotation limiter 6 has been rotated with respect to the first portion 3 while the first portion 3 is in the fully depressed position such that the two locking protrusions 34 now engage the second locking recess 30 and the third locking recess 31, the third locking recess 31 being adjacent to the second locking recess 30. Thus, stop 24 of rotation limiter 6 now engages handle housing 4 when the brake actuator 3 is fully depressed, thereby preventing rotation of the brake lever 8 away from the handle housing 4 and maintaining the brake system 1 in the brake fully-disengaged configuration. In the example shown, two locking protrusions 34 have been provided in the rotation limiter 6, however a single locking protrusion could instead be provided. Furthermore, examples are envisaged wherein the rotation limiter 6 comprises the locking recesses 29, 30, 31 and the first portion 3 or brake lever 8 comprises at least one locking protrusion 34. The skilled person will understand that the number of pre-determined locking positions corresponds to the number of locking recesses minus the number of locking protrusions plus one. In the example shown, three locking recesses 29, 30, 31 and two locking protrusions 34 are provided, therefore defining three predetermined locking positions of the brake actuator 3.

To enable the locking protrusions 34 to disengage from their respective locking recesses 29, 30, 31, the arcuate portion of rotation limiter 6 is configured to be resilient such that when sufficient force is applied to the rotation limiter 6, rotation of the rotation limiter 6 with respect to the first portion 3 (for example, due to a force being applied by the user to the rotation limiter 6 as indicated by arrow Z) causes the resilient portion to flex such that the locking protrusions 34 disengage from their respective locking recesses 29, 30, 31 and slide to the next adjacent locking recess 29, 30, 31 so as to engage therewith.

The function of the rotation limiter 6 is therefore to reduce the distance between the stop 24 and the second portion 4 such that rotation (or movement) of the first portion 3 causes the stop 24 to engage the second portion 4 sooner during rotation (or movement) of the first portion 3 away from the second portion 4, thereby limiting the extent to which the first portion 3 may rotate (or move) away from the second portion 4. In the position of the rotation limiter 6 shown in FIG. 6, the rotation limiter 6 is configured such that the stop 24 engages the handle housing 4 when the first portion 3 is fully depressed against the second portion 4, thereby preventing any movement of the first portion 3 away from the second portion 4 and maintaining the first portion 3 in the fully depressed position and so thereby maintaining the brake system 1 in the brake fully-disengaged configuration.

Figure 7:
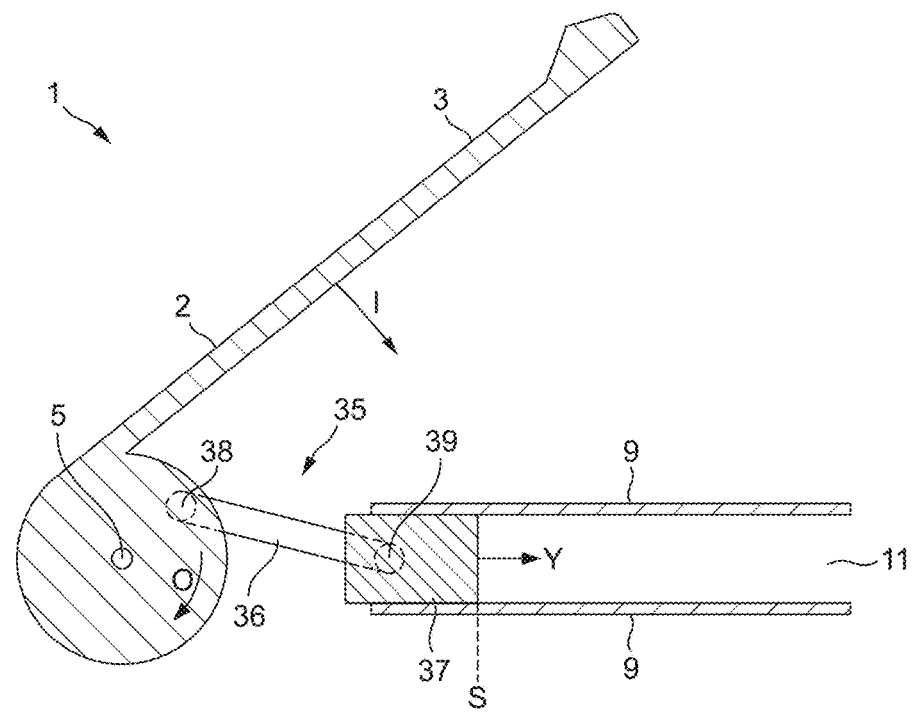
Figure 8:
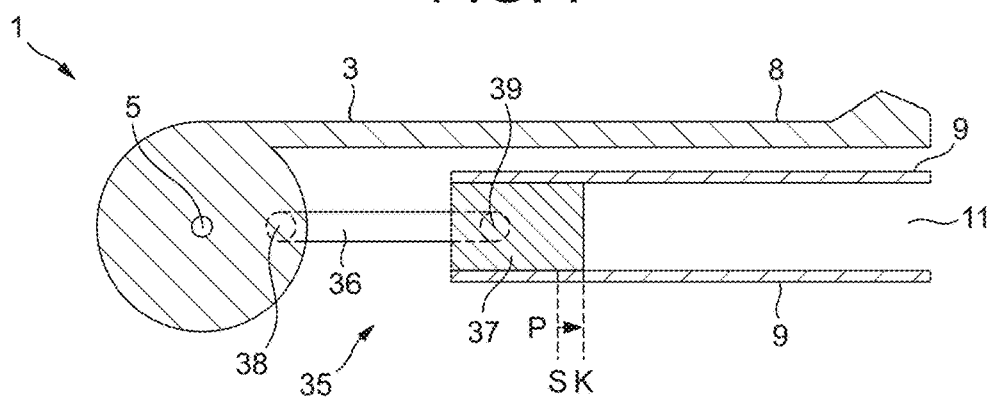
FIG. 8 is a side view cross section of the internal mechanical details of an alternative embodiment of the force transfer means with pressure on the lever, with the lever down, and the brake system in a brake disengaged configuration.

FIGS. 7 and 8 show a schematic of an alternative force-transfer means for transferring force applied to the first portion 3 to the brake actuator 13. All other components are identical to those of the example shown in FIGS. 1 to 6.

In the embodiment of FIGS. 7 and 8, the force-transfer means comprises a crank mechanism 35. The crank mechanism 35 comprises a crank arm 36 coupled to a pusher 37 for applying a force against the brake actuator 13. The crank arm 36 is pivotably connected to the first portion 3 towards a first end 38 of the crank arm and the crank arm 36 is pivotably connected to the pusher 37 at a second end 39 of the crank arm 36, opposed to the first end 38. Thus, the crank mechanism 35 is configured such that rotational movement of the first portion 3 causes linear motion of the pusher 37. In the example shown, this linear motion causes the pusher 37 to slide within the internal cavity 11 of the carrier 9. FIG. 8 shows the movement of the pusher 37 within the internal cavity 11 of the carrier 9 caused by rotation of the first portion 3 from the position shown in FIG. 7 to the fully depressed position show in FIG. 8. As can be seen, rotation of the first portion 3 in the direction of arrow I causes the pusher 37 to move in direction Y a distance along the carrier 9 from point S to point K, thereby compressing the brake actuator 13 against the brake actuator biasing means 17, and thereby to a brake disengaged position.

The crank mechanism 35 of this embodiment also forms part of the first portion biasing means for biasing the first portion 3 away from the second portion 4 and therefore to a brake engaged position, although examples in which separate first portion biasing means and brake actuator biasing means are also envisaged. As such, when force holding the first portion 3 in a depressed position is removed, pusher 37 is pushed by brake actuator 13, itself being pushed by compression spring 17, against pusher 37, causing pusher 37 to push against crank arm 36, thereby producing a moment around rotation axis 5 which causes the first portion 3 to rotate away from the second portion 4.

Figure 9:
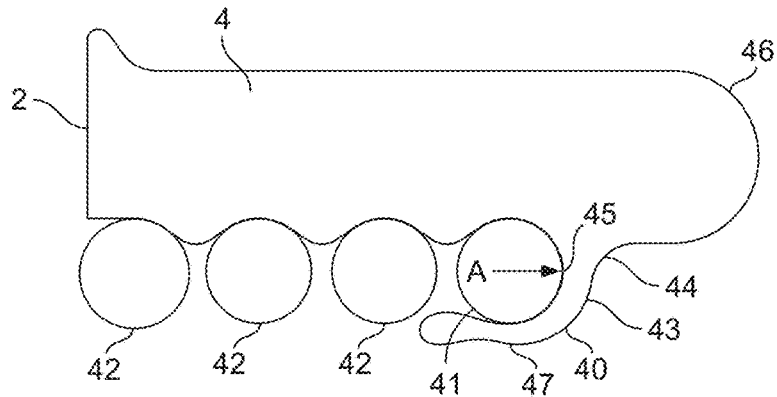
FIG. 9 is a side view of the outer shape of a handle assembly according to a second aspect of the present current disclosure, suitable for use with the brake system of the first aspect, with the addition of integral rear finger support.

FIG. 9 shows a schematic view of an optional feature of the handle 2 wherein the handle further comprises a finger support 40 configured to engage at least one finger of a user to prevent a user's hand from slipping off of the handle 2. Finger support 40 may be integral with handle 2. Finger support 40 may be used with any handle as it prevents the users hand from slipping from the handle 2, and thus does not require the other features of the brake assembly, for example those relating to the first portion and the brake actuator, carrier etc.

When a user's hand is caused to slide along the handle 2, the finger support 40 is configured to engage with the little finger 41 of the user's hand such that movement of the user's hand as indicated by arrow A is prevented from sliding off the rear of the handle 2 (that is, opposite end of the handle to which a mounting means for mounting the handle 2 to a chassis member of a wheeled device) and therefore the user's hand is prevented, and thereby the user's other fingers 42 are also prevented, from slipping off the end of the handle 2 also.

In the example shown, the finger support 40 comprises a hook portion 43 configured to receive a finger of a user, for example the little finger of a user. In the example shown, the hook portion 43 is provided towards the rear of the handle 2, although other positions are also envisaged. The hook portion 43 may also be referred to as a clip as in certain embodiments it may be configured to clip around the finger of a user. The hook portion 43 may comprise a side portion 44, generally extending outwardly from the handle 2, configured to engaged with the side of a user's finger 45, for example their little finger 41. Extending in a direction generally axially (axially with respect to the longitudinal axis of the handle 2) away from the rear of the handle 46 from the side portion 44 is a top portion 47 of the hooked portion 43, the top portion 47 being configured to engage with the top of a user's little finger 41.

Figure 10:
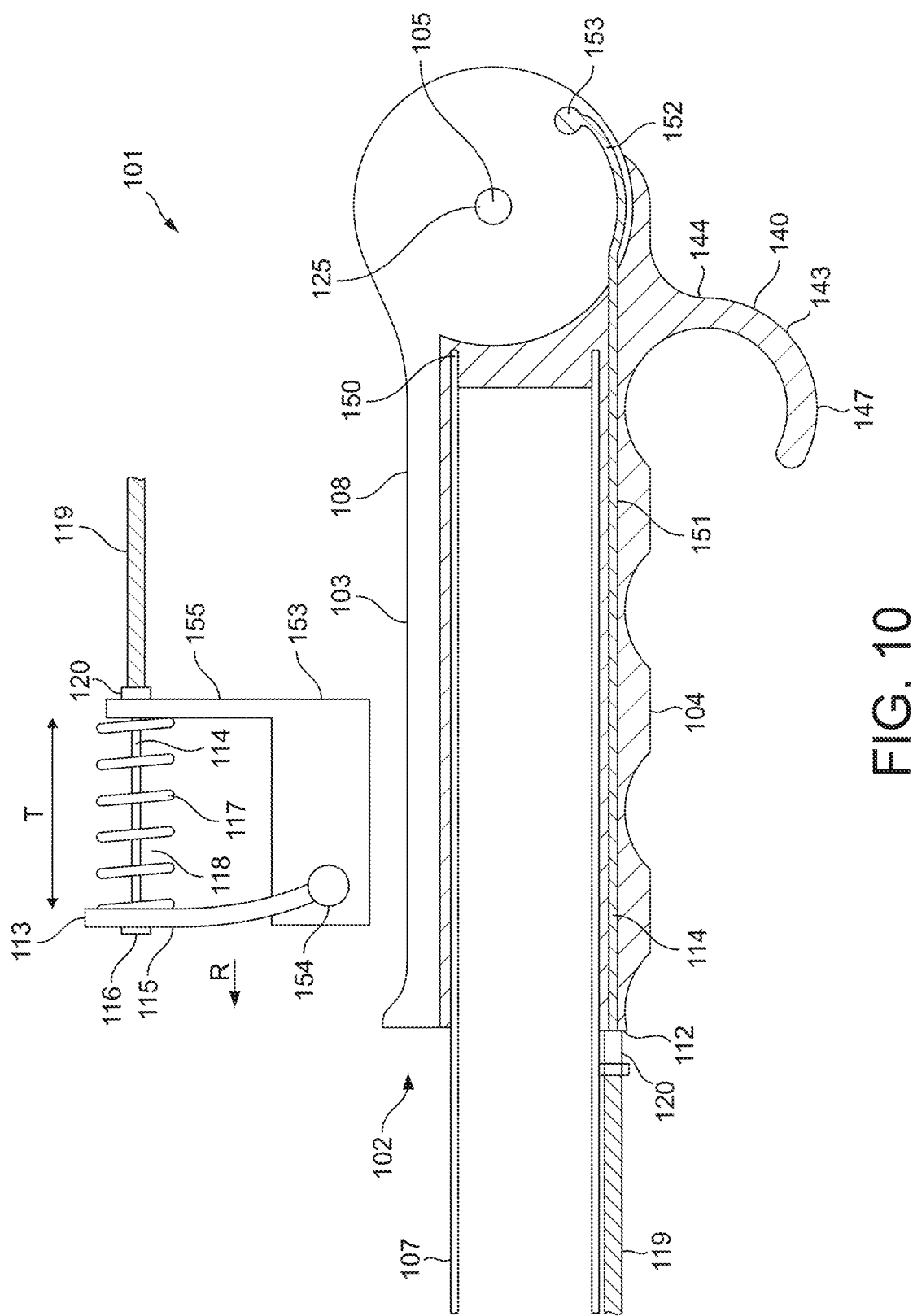
FIG. 10 is a cross-sectional view of a brake system according to a third aspect of the present disclosure, showing a first portion of the handle in a fully-depressed, brake fully-disengaged position and a partial view of a brake actuator of the brake system.

Turning now to FIG. 10, a second embodiment of brake system according to the present disclosure is shown and, as such, similar reference numerals have been used (increased by 100 compared to the first embodiment) to avoid redundant discussion. Thus, reference numeral 1 refers to the brake system of the first embodiment whereas reference numeral 101 refers to the brake system of the second embodiment, and so on.

FIG. 10 is a simplified schematic view and, as such, the rotation limiter as discussed above is not shown, however examples of the second embodiment are envisaged wherein a rotation limiter substantially the same as that discussed above are used.

The brake system 101 comprises a handle 102 comprising a first portion 103 and a second portion 104, in the same way as in the first embodiment. The first portion 103 is rotationally coupled to the second portion by rotational coupling or hinge 125, also in the same way as in the first embodiment. Thus, first portion 103 is configured to rotate towards and away from the second portion 104. In FIG. 10 the first portion 103 is shown in the fully-depressed position, that is that it is fully rotated towards the second portion 104 such that it lies substantially flush with the second portion 104, and, in this second embodiment as in the first embodiment, the first portion 103 and the second portion 104 are configured such that the first portion 103 lies substantially flush with the second portion 104 so as to form a generally continuous outer surface of the handle 102 for being gripped by a user.

The second portion 104 comprises a longitudinal internal bore 149 sized so as to receive a chassis member 107 of a wheeled device. An annular groove 150 is provided at the end of the bore 149 which is configured to receive the end of the chassis member 107 such that the end of the chassis member 107 may abut against the end of the annular groove 150. Although not shown, the handle 102 may optionally comprise the same mounting means for mounting the handle 102 to the chassis member 107 of a wheeled device as that discussed above in respect of the first embodiment and so is not further discussed here in order to avoid redundant discussion. The second portion also comprises the same finger support 140 as that discussed above in respect of the first embodiment and so is also not further discussed here, also in order to avoid redundant discussion.

The second portion 104 comprises an internal, integrally formed, passageway 151 for slidingly receiving a brake cable 114 such that the brake cable 114 may slide along the passageway 151. In the example shown, the passageway 151 is a substantially straight bore passing from one distal end of the second portion 104 to the other 104. The second portion 104 also comprises a brake-cable sheath receiving means 112 for affixing a brake cable sheath thereto, by way of brake cable sheath adjustor 120.

The first portion 103 comprises a brake cable guide, or brake cable receiving means for receiving a brake cable 114. In the example shown, the brake cable guide comprises an internal, integrally formed, passageway 152, although other such brake cable guides may be used and may not be internal or integrally formed, such as an open-channel. The brake cable 114 is affixed, or coupled, to the first portion 103 be way of a recess 153 for receiving a brake cable anchor provided at the end of a brake cable 114, although any other such means may be provided for affixing or coupling the brake cable 114, for example an end thereof, to the first portion 103.

In the example show, the brake cable is affixed to the first portion 103 such that it is spaced away from the rotational coupling 125 and thereby the rotation axis 105 of the first portion 103. Thus when the first portion 103 is in a partially depressed position and it is rotated towards to the second portion 104, the bake cable 114 is caused to be pulled through the passageway 151 of the second portion 103.

The other end of the brake cable 114 comprises an anchor 116, such as a brake cable nipple or barrel. A brake actuator 113 comprises brake cable receiving, or retaining, means for receiving the brake cable 114, for example the other end of the brake cable 114. In the example shown, the brake actuator 113 comprises a recess configured to receive a nipple 116 provided at the end of the brake cable 114. The brake actuator is pivotally coupled to a bracket 153 by pivotable coupling 154. The bracket 153 comprises brake cable sheath receiving means 120 for receiving a brake cable sheath, for example for receiving and adjustor of a brake cable sheath, and for affixing the brake cable sheath 119 thereto. In the example shown, the brake cable sheath receiving means 120 is provided on an arm 155 of the bracket 153.

A brake actuator biasing means 117 is configured to bias the brake actuator 113 to a brake-engaged position. In the example shown, the brake actuator biasing means 117 comprises a compression spring 117 which is provided between the bracket 153 and the brake actuator 113, although the brake actuator biasing means 117 may be located elsewhere so long as it applies a biasing force to the brake actuator 113, and similarly other biasing means 117 other than a compression may be used. In the example shown, the compression spring 117 is arrange such that the brake cable 114 passes through the annular space 188 of the brake cable 114, as in the first embodiment, although other configurations are also envisaged.

When a user depresses the first portion 103 towards the second portion 104 and tension is applied to the brake cable 114 such that it is pulled through the passageway 151, the other end of the brake cable 114 pulls on the brake actuator 113 so as to apply a force on the compression spring 117 which overcomes the biasing force of the compression spring 117, causing the compression spring 117 to compress (as shown in FIG. 10, arrow T), thereby enabling the brake actuator 113 to move to a brake disengaged position, thereby disengaging a brake of the wheeled device.

Similarly, when a user releases the first portion 103, compression spring 117 biases the brake actuator 113 away from the brake disengaged position to the brake engaged position (that is, away from the brake cable sheath receiving means 120, arrow R) thereby causing the brake actuator 113 to pull on the end of the brake cable 114, causing the other end of the brake cable 114 to slide within the passageway 151 of the second portion 104 and to pull on the first portion 103 so as to apply a moment to the first portion 103, thereby causing the first portion 103 to rotate about rotation axis 105 away from the fully-depressed position and thereby away from the second portion 104 to a raised position.

It is envisaged that the skilled person in the art may make various changes to the embodiments specifically described above without departing from the scope of the disclosure.

The invention claimed is:

1. A brake system for use with a wheeled device, the brake system comprising:
   a handle comprising a first portion and a second portion, wherein the first portion is moveably coupled to the second portion;
   a carrier comprising an internal cavity;
   a brake actuator for actuating a brake, the brake actuator being arranged within the internal cavity;
   brake actuator biasing means for applying a biasing force to the brake actuator for biasing the brake actuator to a brake-engaged position; and
   force-transfer means coupled to the first portion and to the brake actuator such that movement of the first portion towards the second portion causes the brake actuator to move along the internal cavity of the carrier against the biasing force to a brake-disengaged position;
   wherein the first portion of the handle is rotatably coupled to the second portion, wherein the brake system comprises a rotation limiter for limiting the extent to which the first portion of the handle is rotatable away from the second portion, the rotation limiter being configured to be rotatable independently of the first portion of the handle and the rotation limiter comprising a stop configured to abut against a portion of the handle for limiting the extent of rotation of the first portion, the rotation limiter comprising locking means for rotationally locking the rotation limiter to the first portion of the handle.

2. The brake system of claim 1, wherein the first portion of the handle is rotatably coupled to the second portion towards a distal end of the first portion and/or towards a distal end of the second portion.

3. The brake system of claim 1, wherein the carrier is configured to guide the brake actuator within the internal cavity and the brake actuator is configured to slide along the internal cavity.

4. The brake system of claim 1, wherein the brake actuator biasing means is provided within the internal cavity.

5. The brake system of claim 1, wherein the brake system is configured such that progressive movement of the first portion of the handle towards the second portion causes the brake actuator to progressively move towards the brake-disengaged position.

6. The brake system of claim 1, wherein the brake actuator biasing means is configured to also bias the first portion of the handle away from the second portion.

7. The brake system of claim 1, wherein the brake actuator biasing means comprises a first portion biasing means for biasing the first portion of the handle away from the second portion.

8. The brake system of claim 1, wherein the force-transfer means comprises a cam rotationally coupled to the first portion of the handle, and the force-transfer means further comprises a cam follower configured to engage with the cam, the cam follower being coupled to the brake actuator such that movement of the cam follower causes the brake actuator to move along the internal cavity towards and away from the brake disengaged and brake engaged positions.

9. The brake system of claim 8, wherein the cam follower is configured to slide within the interval cavity.

10. The brake system of claim 9, wherein the cam comprises a cam surface having a varying cam profile such that the contact angle between the cam surface and the cam follower is reduced at a first rotational position of the cam than at a second rotational position.

11. The brake system of claim 10, wherein the cam profile is shaped such that, at said first rotational position of the cam, the contact angle between the cam surface and the cam follower is such that a reduced force is required to maintain the first portion in a first position of the first portion than in a second position of the first portion.

12. The brake system of claim 11, wherein the cam profile is shaped such that the force required to move the first portion towards the second portion increases the further the first portion moves away from the second portion.

13. The brake system of claim 1, wherein the force-transfer means comprises a crank configured to convert rotational movement of the first portion of the handle to linear motion of the brake actuator within the internal cavity.

14. The brake system of claim 1, wherein the brake actuator comprises brake cable coupling means for coupling the brake actuator to a brake cable for pulling on said brake cable.

15. The brake system of claim 1, wherein the locking means comprises at least one locking protrusion and at least one locking recess configured to engage with the at least one locking protrusion, the at least one locking protrusion and at least one locking recess being configured such that, when engaged with each other, rotation of the first portion of the handle with respect to the second portion is prevented.

16. The brake system of claim 15, wherein the first portion of the handle comprises one of the at least one protrusions or the at least one recesses, and the rotation limiter comprises the other.

17. A brake system for use with a wheeled device, the brake system comprising:
a handle comprising a first portion and a second portion, wherein the first portion is moveably coupled to the second portion;
the first portion comprising brake cable receiving means for receiving a first end of a brake cable for pulling on the first end of the brake cable;
a brake actuator for actuating a brake;
brake actuator biasing means configured to apply a biasing force to the brake actuator for biasing the brake actuator to a brake-engaged position;
the brake actuator comprising brake cable receiving means for receiving a second end of the brake cable for pulling on the second end of the brake cable;
the brake actuator being configured such that, when a first end of a brake cable is received in the brake cable receiving means of the first portion and a second end of the brake cable is received in the brake cable receiving means of the brake actuator, movement of the first portion towards the second portion causes the brake actuator to move against the biasing force to a brake-disengaged position; and
wherein the brake system comprises a rotation limiter for limiting the extent to which the first portion of the handle is rotatable away from the second portion, the rotation limiter being configured to be rotatable independently of the first portion of the handle and the rotation limiter comprising a stop configured to abut against a portion of the handle for limiting the extent of rotation of the first portion, the rotation limiter comprising locking means for rotationally locking the rotation limiter to the first portion of the handle.

18. The brake system of claim 17, wherein the first portion of the handle is rotatably coupled to the second portion towards a distal end of the first portion and/or towards a distal end of the second portion.

19. The brake system of claim 17, wherein the second portion comprises an internal passageway for slidably receiving a brake cable.

20. The brake system of claim 17, wherein the brake system is configured such that progressive movement of the first portion of the handle towards the second portion causes the brake actuator to progressively move towards the brake-disengaged position, and wherein progressive movement of the first portion of the handle away from the second portion causes the brake actuator to progressively move away from the brake-disengaged position towards the brake-engaged position.

21. The brake system of claim 17, wherein the brake actuator biasing means is configured to also bias the first portion of the handle away from the second portion.

22. The brake system of claim 17, wherein the second portion comprises a brake cable sheath receiving means and a brake-cable sheath is arranged around a length of the brake cable, wherein the brake-cable sheath is received by the brake-cable sheath receiving means and the brake-cable sheath receiving means is configured such that, in use, the brake-cable sheath is routed through a chassis member of a wheeled device.

\* \* \* \* \*